(12) United States Patent
Kwon

(10) Patent No.: US 12,474,545 B2
(45) Date of Patent: Nov. 18, 2025

(54) IMAGING LENS

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 552 days.

(21) Appl. No.: 17/760,255

(22) PCT Filed: Jan. 28, 2021

(86) PCT No.: PCT/KR2021/001177
§ 371 (c)(1),
(2) Date: Aug. 5, 2022

(87) PCT Pub. No.: WO2021/157959
PCT Pub. Date: Aug. 12, 2021

(65) Prior Publication Data
US 2023/0057429 A1 Feb. 23, 2023

(30) Foreign Application Priority Data
Feb. 5, 2020 (KR) ........................ 10-2020-0013855

(51) Int. Cl.
*G02B 9/62* (2006.01)
*G02B 13/00* (2006.01)
*G02B 3/14* (2006.01)

(52) U.S. Cl.
CPC ........... *G02B 9/62* (2013.01); *G02B 13/0045* (2013.01); *G02B 3/14* (2013.01)

(58) Field of Classification Search
CPC ......... G02B 9/62; G02B 13/0045; G02B 3/14
USPC ......................................................... 359/757
See application file for complete search history.

(56) References Cited

FOREIGN PATENT DOCUMENTS

| CN | 109782380 A | 5/2019 |
|---|---|---|
| JP | 2012-103626 A | 5/2012 |
| JP | 2017-49329 A | 3/2017 |
| KR | 10-2014-0052907 A | 5/2014 |
| KR | 10-2018-0092358 A | 8/2018 |

OTHER PUBLICATIONS

International Search Report dated Apr. 13, 2021 in International Application No. PCT/KR2021/001177.

*Primary Examiner* — Bumsuk Won
*Assistant Examiner* — Grant A Gagnon
(74) *Attorney, Agent, or Firm* — SALIWANCHIK, LLOYD & EISENSCHENK

(57) ABSTRACT

The present embodiment relates to an imaging lens including: a first lens having a positive refractive power, a second lens having a negative refractive power; a third lens; a fourth lens; a fifth lens having a positive refractive power; and a sixth lens having a negative refractive power, wherein the first to sixth lenses are sequentially arranged from an object side to an image side, the first to third, the fifth, and the sixth lenses are solid lenses, the fourth lens includes a variable focus lens, and the Conditional Expression 0.7<TTL/imgH<1 is satisfied.

20 Claims, 5 Drawing Sheets

IMAGING LENS

CROSS-REFERENCE TO RELATED APPLICATIONS

This application is the U.S. national stage application of International Patent Application No. PCT/KR2021/001177, filed Jan. 28, 2021, which claims the benefit under 35 U.S.C. § 119 of Korean Application No. 10-2020-0013855, filed Feb. 5, 2020, the disclosures of each of which are incorporated herein by reference in their entirety.

TECHNICAL FIELD

The present embodiment relates to an imaging lens.

BACKGROUND ART

Recently, in relation to an image pick-up system, a camera module for a communication terminal, a digital still camera (DSC), a camcorder, a PC camera (imaging device attached to a personal computer), and the like are being studied. One of the most important components for the camera module associated with such an image pickup system to obtain an image is an imaging lens for forming an image.

Portable terminals such as mobile phones or vehicle cameras are gradually becoming smaller and/or lighter. In line with this trend, imaging lenses are also becoming smaller. In addition, in addition to implementing the imaging lens small, high performance of the imaging lens is also required in response to the high performance of the light receiving element.

A conventional imaging lens performs auto-focusing (AF) and optical image stabilization (OIS) functions through a lens driving device of a voice coil motor type. Accordingly, there is a problem in that it is difficult to reduce the size of the entire camera module.

DETAILED DESCRIPTION OF THE INVENTION

Technical Subject

The present embodiment is intended to provide an imaging lens comprising a liquid lens.

Furthermore, the present embodiment is intended to provide a camera module having a reduced size through an imaging lens according to the present embodiment when compared to a camera module comprising a lens driving device of a voice coil motor method.

Technical Solution

An imaging lens according to the present embodiment comprises: a first lens having positive refractive power; a second lens having negative refractive power; a third lens having refractive power; a fourth lens; a fifth lens having positive refractive power; and a sixth lens having negative refractive power, wherein the first to sixth lenses are sequentially disposed from the object side to the image side, wherein the first to third lenses and the fifth and sixth lenses are solid lenses, wherein the fourth lens comprises a variable focus lens, and wherein Conditional Expression 1 below may be satisfied.

$0.7 < TTL/imgH < 1$  [Conditional Expression 1]

(In the Conditional Expression 1, TTL means the distance from the object side surface of the first lens to the imaging plane on the optical axis, and imgH means the diagonal length of the imaging plane of the image sensor.)

An imaging lens according to the present embodiment comprises: a first lens having positive refractive power; a second lens having negative refractive power; a third lens having refractive power; a fourth lens; a fifth lens having positive refractive power; and a sixth lens having negative refractive power, wherein the first to sixth lenses are sequentially disposed from the object side to the image side, wherein the first to third lenses and the fifth and sixth lenses are solid lenses, wherein the fourth lens comprises a variable focus lens, and wherein Conditional Expression 2 below may be satisfied.

$2 < Fno < 2.5$  [Conditional Expression 2]

(In the Conditional Expression 2, Fno means the F-number of the entire optical system.)

In addition, the third lens may have a positive refractive power.

In addition, an object side surface of the first lens may be convex, and an image side surface of the first lens may be convex.

In addition, an object side surface of the second lens may be convex, and an image side surface of the second lens may be concave.

In addition, an object side surface of the third lens may be convex, and an image side surface of the third lens may be convex in an optical axis.

In addition, an object side surface of the fifth lens may be convex in an optical axis, and an image side surface of the fifth lens may be convex in the optical axis.

In addition, an object side surface of the sixth lens may be concave in an optical axis, and the image side surface of the sixth lens may be convex in the optical axis.

In addition, the imaging lens may satisfy Conditional Expression 3 below.

$0 < Fg1/L1R1 < 5$  [Conditional Expression 3]

(In the Conditional Expression 3, Fg1 means a composite focal length from the first lens to the third lens disposed on the object side of the variable focus lens, and L1R1 means a radius of curvature of the object side surface of the first lens.)

In addition, the imaging lens may satisfy Conditional Expression 4 below.

$1.5 < G1 < 1.6$  [Conditional Expression 4]

(In the Conditional Expression 4, G1 means the refractive index of the material of the first lens.)

In addition, the refractive index of the material of the first lens may be smaller than the refractive index of the material of the second lens.

In addition, the refractive index of the material of the first lens may be the same as the refractive index of the material of the fifth lens or the refractive index of the material of the sixth lens.

In addition, the thickness of the first lens may be greater than the thickness of the second lens.

In addition, the imaging lens may satisfy Conditional Expression 5 below.

$|Fg2|/L1R1 > 2$  [Conditional Expression 5]

(In the Conditional Expression 5, Fg2 means a composite focal length from the fifth lens to the sixth lens disposed on the image side of the variable focus lens, and L1R1 means a radius of curvature of the object side surface of the first lens.)

In addition, the imaging lens may satisfy Conditional Expression 6 below.

$$30<V1<60 \quad \text{[Conditional Expression 6]}$$

(V1 in the Conditional Expression 6 means the Abbe's number of the first lens.)

In addition, the imaging lens may satisfy Conditional Expression 7 below.

$$0.1<THlg1/TTL<0.4 \quad \text{[Conditional Expression 7]}$$

(In the Conditional Expression 7, THlg1 means the distance from the object side surface of the first lens to the image side surface of the third lens on the optical axis, and TTL means the distance from the object side surface of the first lens to the imaging plane on the optical axis.) In addition, the imaging lens may satisfy the following Conditional Expression 8.

$$0.1<THlg2/TTL<0.5 \quad \text{[Conditional Expression 8]}$$

(THlg2 in the Conditional Expression 8 means the distance from the object side surface of the fifth lens to the image side surface of the sixth lens on the optical axis, and TTL means the distance from the object side surface of the first lens to the imaging plane on the optical axis.) In addition, the imaging lens may satisfy the following Conditional Expression 9.

$$0.5<THlg1/d1<1.5 \quad \text{[Conditional Expression 9]}$$

(In the Conditional Expression 9, THlg1 means the distance from the object side surface of the first lens to the image side surface of the third lens on the optical axis, and d1 is the optical axis distance from the imaginary tangent line at the apex of the image side surface of the third lens to the imaginary tangent line at the apex of the object side surface of the fifth lens.) In addition, the imaging lens may satisfy the following Conditional Expression 10.

$$1<THlg1/d2<2 \quad \text{[Conditional Expression 10]}$$

(THlg1 in the Conditional Expression 10 means the distance from the object side surface of the first lens to the image side surface of the third lens on the optical axis, and d2 means the thickness of the fourth lens on the optical axis.)

In addition, the imaging lens may satisfy the following Conditional Expression 11.

$$0.5<THlg2/d1<1.5 \quad \text{[Conditional Expression 11]}$$

(THlg2 in the Conditional Expression 11 means the distance from the object side surface of the fifth lens to the image side surface of the sixth lens on the optical axis, and d1 is the optical axis distance from the imaginary tangent at the apex of the image side surface of the third lens to the imaginary tangent at the apex of the object side surface of the fifth lens.)

In addition, the imaging lens may satisfy the following Conditional Expression 12.

$$1<THlg2/d2<2.3 \quad \text{[Conditional Expression 12]}$$

(THlg2 in the Conditional Expression 12 means the distance from the object side surface of the fifth lens to the image side surface of the sixth lens on the optical axis, and d2 means the thickness of the fourth lens on the optical axis.)

In addition, the imaging lens may satisfy the following Conditional Expression 13.

$$1<Fno/d1<3 \quad \text{[Conditional Expression 13]}$$

(In the Conditional Expression 13, Fno means the F-number of the entire optical system, and d1 means the optical axis distance from the imaginary tangent line at the apex of the image side surface of the third lens to the imaginary tangent line at the apex of the object side surface of the fifth lens.)

In addition, the variable focus lens comprises a liquid lens, wherein the liquid lens may comprise: a first plate; a second plate spaced apart from the first plate and disposed closer to the image side than the first plate; a first liquid disposed between the first plate and the second plate and having conductivity; and a second liquid disposed between the first plate and the second plate and having non-conductivity.

In addition, the liquid lens comprises an interface being formed as the first liquid is in contact with the second liquid, wherein the curvature of the interface of the liquid lens is varied by the voltage being applied, and wherein the first plate and the second plate may be formed of a flat plate.

A camera module according to another embodiment of the present invention may comprise: an image sensor; the imaging lens; and a filter being disposed between the image sensor and the imaging lens.

A smartphone according to another embodiment of the present invention may comprise the camera module.

The imaging lens system according to the present embodiment comprises: a first lens group comprising at least one solid lens; a second lens group spaced apart from the first lens group and comprising at least one solid lens; and a variable focus lens disposed between the first lens group and the second lens group, wherein the following Conditional Expression 14 can be satisfied.

$$0.7<TTL/\text{imgH}<1 \quad \text{[Conditional Expression 14]}$$

(In the Conditional Expression 14, TTL means the distance from the object side surface of the lens closest to the object side on the optical axis to the imaging plane, and imgH means the diagonal length of the imaging plane of the image sensor.)

The imaging lens system according to the present embodiment comprises: a first lens group comprising at least one solid lens; a second lens group spaced apart from the first lens group and comprising at least one solid lens; and a variable focus lens disposed between the first lens group and the second lens group, wherein the following Conditional Expression 15 can be satisfied.

$$2<Fno<2.5 \quad \text{[Conditional Expression 15]}$$

(In the Conditional Expression 15, Fno means the F-number of the entire optical system.)

In addition, the number of solid lenses in the first lens group may be greater than the number of solid lenses in the second lens group.

In addition, a lens closest to the object side in the first lens group may have positive refractive power, and a lens closest to the image side in the second lens group may have negative refractive power.

In addition, the first lens group comprises: a first lens having positive refractive power; a second lens having negative refractive power; and a third lens, wherein the second lens group may comprise a fourth lens having positive refractive power and a fifth lens having negative refractive power.

Advantageous Effects

Through the present embodiment, it is possible to provide an imaging lens that can perform AF function and OIS function.

Through this, it is possible to provide a miniaturized camera module.

In addition, it is possible to provide an imaging lens with excellent aberration characteristics and good aberration correction capability.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, in describing the configuration of each lens, the term 'object side surface' refers to the surface of the lens facing the object, and the term 'image side surface' refers to the surface of the lens facing the imaging plane.

The unit of length, distance, radius of curvature, thickness, and the like being used hereinafter may be mm.

Hereinafter, the configuration of the imaging lens according to the first embodiment of the present invention will be described with reference to the drawings.

Figure 1:
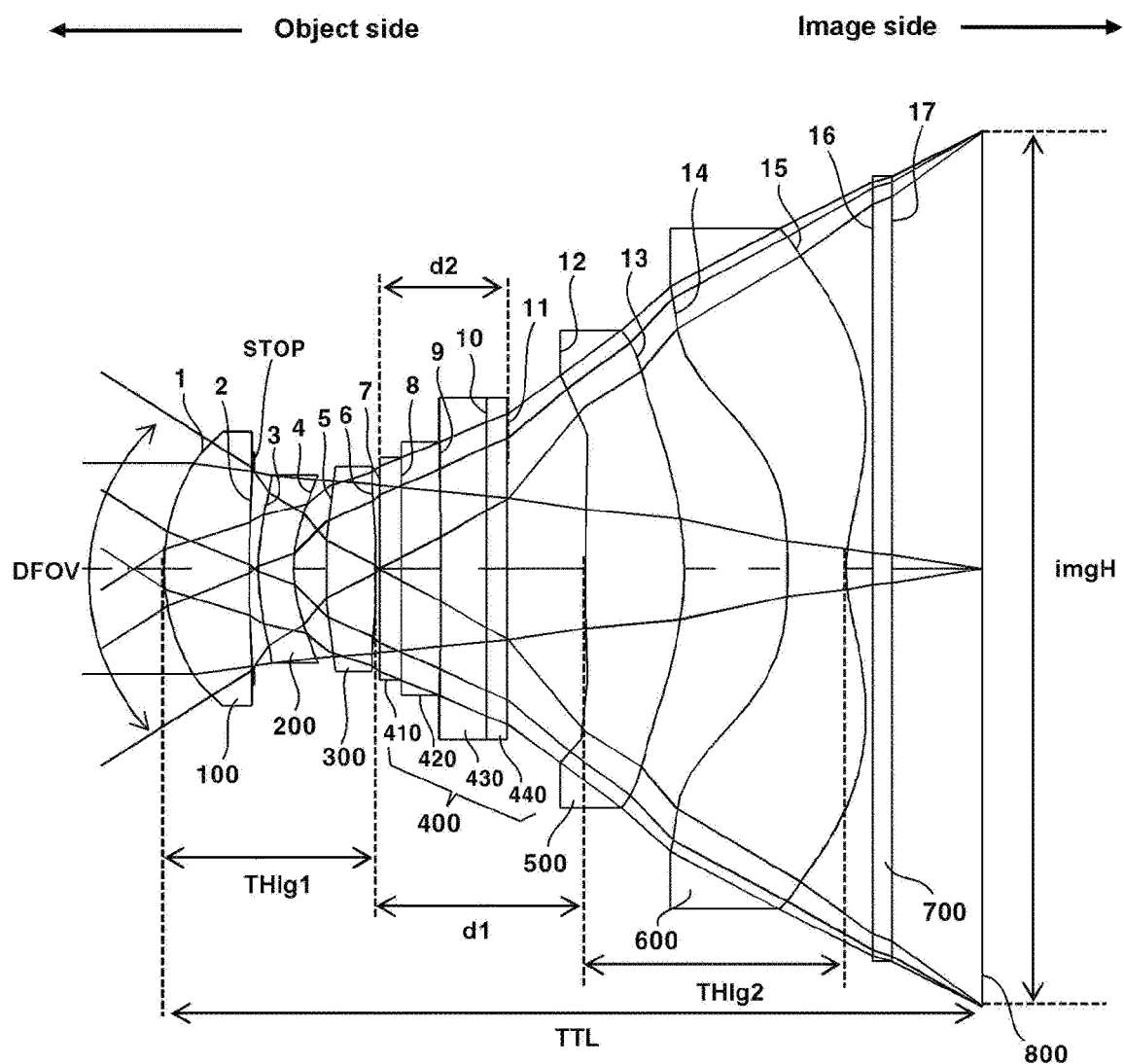
FIG. 1 is a block diagram of an imaging lens according to a first embodiment of the present invention.

FIG. 1 is a block diagram of an imaging lens according to a first embodiment of the present invention.

The imaging lens according to the first embodiment of the present invention may comprise a plurality of lenses. The imaging lens may comprise a six-element lens. The imaging lens may comprise a total of six lenses. The imaging lens may comprise a first lens 100, a second lens 200, a third lens 300, a fourth lens 400, a fifth lens 500, a sixth lens 600, and an iris STOP. However, in the imaging lens according to the first embodiment, any one or more among the first lens 100, the second lens 200, the third lens 300, the fourth lens 400, the fifth lens 500, the sixth lens 600, and the iris STOP may be omitted. Imaging lenses may be disposed with a first lens 100, an iris STOP, a second lens 200, a third lens 300, a fourth lens 400, a fifth lens 500, and a sixth lens 600 in order from object side to image side. In a modified embodiment, the imaging lens may be configured with 5 or fewer lenses. Or, the imaging lens may comprise seven or more lenses.

In another embodiment, any one or more of another lens, a flat plate, and an optical member may be added between the first lens 100 to the sixth lens 600. In addition, any one or more of another lens, a flat plate, and an optical member may be added in front of the first lens 100 or at a rear side of the sixth lens 600. In addition, any one or more of another lens, a flat plate, and an optical member may be added between the iris STOP and the lens, between the lens and the filter 700, and between the filter 700 and the image sensor 800. At this time, the filter 700 may be a flat lens. The refractive power of the flat lens may be '0'. A flat lens may have no refractive power. In addition, a filter layer may be disposed between the iris STOP and the lens, between the lens and the filter 700, and between the filter 700 and the image sensor 800. In this case, the filter layer can be coated to become a filter.

The first to sixth lenses 100, 200, 300, 400, 500, and 600 may be sequentially disposed from the object side to the image side. The first lens 100 may be disposed closest to the object side. The sixth lens 600 may be disposed closest to the image side. The first lens 100 may be firstly disposed at the object side. The second lens 200 may be secondly disposed at the object side. The third lens 300 may be thirdly disposed at the object side. The fourth lens 400 may be fourthly disposed at the object side. The fifth lens 500 may be fifthly disposed at the object side. The sixth lens 600 may be sixthly disposed at the object side. The sixth lens 600 may be lastly disposed with respect to the object side among the plurality of lenses.

The second lens 200 may be disposed between the first lens 100 and the third lens 300. The third lens 300 may be disposed between the second lens 200 and the fourth lens 400. The fourth lens 400 may be disposed between the third lens 300 and the fifth lens 500. The fifth lens 500 may be disposed between the fourth lens 400 and the sixth lens 600. The first lens 100 may be disposed closer to the object side than the second lens 200. The sixth lens 600 may be disposed closer to the image side than the fifth lens 500.

The imaging lens according to the present embodiment may comprise a total of 6 lenses. As a modified embodiment, any one or more among the first to sixth lenses 100, 200, 300, 400, 500, and 600 may be omitted. A separate lens may be additionally disposed between the first to sixth lenses 100, 200, 300, 400, 500, and 600. A separate lens may be additionally disposed at the object side of the first lens 100. A separate lens may be additionally disposed at the image side of the sixth lens 600.

The imaging lens may comprise a first lens 100. The first lens 100 may be closest to the object side. The first lens 100 may be a lens firstly disposed at the object side. The first lens 100 may be the first adjacent lens from the object side. A lens may be additionally disposed between the first lens 100 and the second lens 200. The second to fifth lenses 200, 300, 400, and 500 may be disposed between the first lens 100 and the sixth lens 600. Lenses other than the second to fifth lenses 200, 300, 400, and 500 may be additionally disposed between the first lens 100 and the sixth lens 600. A lens may be additionally disposed between at least two of the first to sixth lenses 100, 200, 300, 400, 500, and 600.

The first lens 100 may have positive refractive power. The first lens 100 may be formed to be convex on both sides. The object side surface of the first lens 100 may be formed to be convex. The object side surface of the first lens 100 may be formed to be convex in the optical axis. The first lens 100 may comprise an object side surface having a convex shape. The first lens 100 may comprise an object side surface having a convex shape in the optical axis. The image side surface of the first lens 100 may be formed to be convex. The image side surface of the first lens 100 may be formed to be convex in the optical axis. The first lens 100 may comprise an image side surface having a convex shape. The first lens 100 may comprise an image side surface having a convex shape in the optical axis. The object side surface or the image side surface of the first lens 100 may comprise at least one inflection point.

The radius of curvature of the object side surface of the first lens 100 may be a positive number. The radius of curvature in the optical axis of the object side surface of the first lens 100 may be a positive number. The radius of curvature of the image side surface of the first lens 100 may be a negative number. The radius of curvature of the image side surface in the optical axis of the first lens 100 may be a negative number. The absolute value of the radius of curvature of the object side surface of the first lens 100 may be greater than the absolute value of the radius of curvature of the image side surface of the first lens 100. The first lens 100 may be a solid lens.

Both surfaces of the first lens 100 may be formed in a spherical shape. Both surfaces of the first lens 100 may be formed as aspherical surfaces. One surface of both surfaces of the first lens 100 may be formed as a spherical surface and the other surface may be formed as an aspherical surface.

The first lens 100 may be formed of a material having a refractive index. The first lens 100 may be formed of a material having a lower refractive index than that of the second lens 200. The first lens 100 may be formed of a material having the same refractive index as the third lens 300, the fifth lens 500, and the sixth lens 600.

The first lens 100 may satisfy a range of 1.5<N1<1.6. In addition, the first lens 100 may satisfy a range of 1.52<N1<1.58. N1 is a refractive index of the first lens 100. The first lens 100 may satisfy a range of 50<V1<60. In addition, the first lens 100 may satisfy a range of 52<V1<58. V1 is Abbe's number of the first lens 100.

The imaging lens may comprise a second lens 200. The second lens 200 may be a lens secondly disposed from the object side. The second lens 200 may be a lens that is second adjacent to the object side. The second lens 200 may be disposed between the first lens 100 and the image side. The second lens 200 may be disposed between the first lens 100 and the third lens 300. A lens may be additionally disposed between the second lens 200 and the first lens 100 or between the second lens 200 and the third lens 300.

The second lens 200 may have a negative refractive power. The object side surface of the second lens 200 may be formed to be convex. The object side surface of the second lens 200 may be formed to be convex in the optical axis. The second lens 200 may comprise an object side surface having a convex shape. The second lens 200 may comprise an object side surface having a convex shape in the optical axis. The image side surface of the second lens 200 may be formed to be concave. The image side surface of the second lens 200 may be formed to be concave in the optical axis. The second lens 200 may comprise an image side surface having a concave shape. The second lens 200 may comprise an image side surface having a concave shape in the optical axis. The second lens 200 may be formed in a meniscus shape in which an object side surface is convex. The second lens 200 may be formed in a meniscus shape in which an object side surface is convex in the optical axis. The object side surface or the image side surface of the second lens 200 may comprise at least one inflection point.

The radius of curvature of the object side surface of the second lens 200 may be a positive number. The radius of curvature in the optical axis of the object side surface of the second lens 200 may be a positive number. The radius of curvature of the image side surface of the second lens 200 may be a positive number. The radius of curvature in the optical axis of the image side surface of the second lens 200 may be a positive number. The radius of curvature of the object side surface of the second lens 200 may be greater than the radius of curvature of the image side surface of the second lens 200. The second lens 200 may be a solid lens.

Both surfaces of the second lens 200 may be formed in a spherical shape. Both surfaces of the second lens 200 may be formed of an aspherical surface. One surface of both surfaces of the second lens 200 may be formed as a spherical surface and the other surface may be formed as an aspherical surface.

The second lens 200 may be formed of a material having a refractive index. The second lens 200 may be formed of a material having a higher refractive index than that of the first lens 100. The second lens 200 may be formed of a material having a higher refractive index than that of the third lens 300. The second lens 200 may be formed of a material having a higher refractive index than that of the fifth lens 500. The second lens 200 may be formed of a material having a higher refractive index than that of the sixth lens 600.

The second lens 100 may satisfy a range of 1.6<N2<1.7. In addition, the second lens 200 may satisfy the range of 1.64<N2<1.68. N2 is a refractive index of the second lens 200. The second lens 200 may satisfy a range of 15<V2<25. In addition, the second lens 200 may satisfy a range of 17<V2<20. V2 is Abbe's number of the second lens 200.

The imaging lens may comprise a third lens 300. The third lens 300 may be a lens thirdly disposed from the object side. The third lens 300 may be a third adjacent lens from the object side. The third lens 300 may be disposed between the second lens 200 and the image side. The third lens 300 may be disposed between the second lens 200 and the fourth lens 400. A lens may be additionally disposed between the third lens 300 and the second lens 200 or between the third lens 300 and the fourth lens 400.

The third lens 300 may have a positive refractive power. The third lens 300 may be formed to be convex on both sides. The object side surface of the third lens 300 may be formed to be convex. The object side surface of the third lens 300 may be formed to be convex in the optical axis. The third lens 300 may comprise an object side surface having a convex shape. The third lens 300 may comprise an object side surface having a convex shape in the optical axis. The image side surface of the third lens 300 may be formed to be convex. The image side surface of the third lens 300 may be formed to be convex in the optical axis. The third lens 300 may comprise an image side surface having a convex shape. The third lens 300 may comprise an image side surface having a convex shape in the optical axis. The object side surface or the image side surface of the third lens 300 may comprise at least one inflection point.

The radius of curvature of the object side surface of the third lens 300 may be a positive number. The radius of curvature in the optical axis of the object side surface of the third lens 300 may be a positive number. The radius of curvature of the image side surface of the third lens 300 may be a negative number. The radius of curvature in the optical axis of the image side surface of the third lens 300 may be a negative number. The absolute value of the radius of curvature of the object side surface of the third lens 300 may be greater than the absolute value of the radius of curvature of the image side surface of the third lens 300. The third lens 300 may be a solid lens.

Both surfaces of the third lens 300 may be formed in a spherical shape. Both surfaces of the third lens 300 may be formed of an aspherical surface. One surface of both surfaces of the third lens 300 may be formed as a spherical surface and the other surface may be formed as an aspherical surface.

The third lens 300 may be formed of a material having a refractive index. The third lens 300 may be formed of a material having the same refractive index as the first lens 100, the fifth lens 500, and the sixth lens 600. The third lens 300 may be formed of a material having a lower refractive index than that of the second lens 200.

The third lens 300 may satisfy a range of 1.5<N3<1.6. In addition, the third lens 300 may satisfy a range of 1.52<N3<1.58. N3 is a refractive index of the third lens 300. The third lens 300 may satisfy a range of 50<V3<60. In addition, the third lens 300 may satisfy a range of 52<V3<58. V3 is Abbe's number of the third lens 300.

The imaging lens may comprise a fourth lens 400. The fourth lens 400 may be a lens to be fourthly disposed from the object side. The fourth lens 400 may be a fourth adjacent lens from the object side. The fourth lens 400 may be a lens thirdly disposed from the image side. The fourth lens 400 may be a third adjacent lens from the image side. The fourth lens 400 may be disposed between the third lens 300 and the image side. The fourth lens 400 may be disposed between the third lens 300 and the fifth lens 500. A lens may be additionally disposed between the fourth lens 400 and the third lens 300 or between the fourth lens 400 and the fifth lens 500.

The fourth lens 400 may comprise a variable focus lens. The variable focus lens may comprise a variable lens surface. The variable focus lens may comprise first to fifth lens surfaces 7, 8, 9, 10, and 11. The variable focus lens may comprise a liquid lens. The fourth lens 400 may comprise a liquid lens. The liquid lens may be a liquid lens comprising two types of liquid. The liquid lens comprising two types of liquids may comprise a conductive liquid and a non-conductive liquid. In this case, the focus may be changed by adjusting the interface between the conductive liquid and the non-conductive liquid using a voltage applied to the liquid lens. The liquid lens may be disposed between the third lens 300 and the fifth lens 500. The liquid lens may be disposed between the solid lenses. The liquid lens may be spaced apart from the solid lens. The liquid lens may be a variable lens. The liquid lens may be an autofocus lens.

The liquid lens may comprise a first liquid 420. The first liquid 420 may be disposed between the second plate 410 and the third plate 440. The first liquid 420 may have conductivity. The first liquid 420 may be in contact with the second liquid 430. The image side surface of the first liquid 420 may be in contact with the object side surface of the second liquid 430. The liquid lens may comprise a second liquid 430. The second liquid 430 may be disposed between the second plate 410 and the third plate 440. The second liquid 430 may have non-conductivity. As a modified embodiment, the first liquid 420 may have non-conductivity and the second liquid 430 may have conductivity.

The liquid lens may comprise an interface. The interface may be formed being formed as the first liquid 420 is in contact with the second liquid 430. The interface may be formed as the image side of the first liquid 420 is in contact with the object side of the second liquid 430. The interface may be a refractive surface. The curvature of the interface may be varied by the voltage being applied.

In a modified embodiment, the liquid lens may be a liquid lens containing one type of liquid. A liquid lens comprising one type of liquid may change the focus by adjusting a membrane being disposed at a position corresponding to the liquid. For example, the focus can be changed by pressing the membrane by the electromagnetic force of the magnet and coil. Or, the liquid lens may be a liquid lens comprising three or more types of liquids.

The liquid lens may comprise a first plate comprising a cavity in which a conductive liquid and a non-conductive liquid are disposed. The liquid lens may comprise an electrode disposed on the first plate. A liquid lens whose focal length is adjusted in response to a driving voltage may receive an operating voltage through an electrode. The electrode of the liquid lens may comprise an individual electrode and a common electrode. There may be one common electrode, and there may be a plurality of individual electrodes. For example, the individual electrodes may comprise 4 or 8 individual electrodes of a liquid lens. The individual electrodes may be disposed on the first surface of the first plate. The common electrode may be disposed on the second surface of the first plate. The common electrode may be disposed on a second surface opposite to the first surface of the liquid lens. When an operating voltage is applied through the individual electrodes and the common electrode, the interface between the conductive liquid and the non-conductive liquid disposed in the lens region may be deformed.

One side of the liquid lens may receive a voltage from an individual electrode. The other side of the liquid lens may receive a voltage from the common electrode. Through this, any one or more of the AF function and the OIS function may be performed.

The fourth lens 400 may comprise a second plate 410. The second plate 410 may be spaced apart from the third plate 440. The third plate 440 may be disposed at the other side of the first plate. The first plate may be disposed between the second plate 410 and the third plate 440. The second plate 410 may be spaced apart from the third plate 440 in the optical axis direction. The second plate 410 may be disposed closer to the object side than the third plate 440. The second plate 410 may cover the object side surface of the first liquid 420. The second plate 410 may be formed of a flat plate. The refractive power of the second plate 410 may be '0'. The second plate 410 may be in contact with the first liquid 420. The distance between the second plate 410 and the third lens 300 in the optical axis may be smaller than the distance between the third plate 440 and the fifth lens 500 in the optical axis. The length of the second plate 410 in a direction perpendicular to the optical axis may correspond to the length of the third plate 440 in the corresponding direction.

The fourth lens 400 may comprise a third plate 440. The third plate 440 may be spaced apart from the second plate 410. The third plate 440 may be spaced apart from the second plate 410 in the optical axis direction. The third plate 440 may be disposed closer to the image side than the second plate 410. The third plate 440 may cover the image side surface of the second liquid 430. The third plate 440 may be formed of a flat plate. The refractive power of the third plate 440 may be '0'. The third plate 440 may be in contact with the second liquid 430. The length of the third plate 440 in a direction perpendicular to the optical axis may correspond to the length of the second plate 410 in the corresponding direction.

The liquid lens may comprise a first liquid 420. The first liquid 420 may be disposed between the second plate 410 and the third plate 440. In addition, the first liquid 420 may be disposed between the second lens surface 8 and the third lens surface 9. The first liquid 420 may have conductivity.

The liquid lens may comprise a second liquid 430. The second liquid 430 may be disposed between the second plate 410 and the third plate 440. In addition, the second liquid 430 may be disposed between the third lens surface 9 and the fourth lens surface 10. The second liquid 430 may have non-conductivity.

When a voltage is applied, the third lens surface 9 of the fourth lens 400 may become convex in the image side direction. When a voltage is applied, the diameter or radius of curvature of the second lens surface 8 of the fourth lens 400 may be reduced. Through this, the fourth lens 400 may have variable refractive power. For example, the refractive power of the fourth lens 400 may vary from negative (−) to positive (+). At this time, the refractive power of the fourth lens 400 may be varied within a range of −50 diopters to 1000 diopters. Unlike this, the fourth lens 400 may vary from 0 to positive (+) or within a positive (+) range.

The imaging lens may comprise a fifth lens 500. The fifth lens 500 may be a lens secondly disposed from the image side. The fifth lens 500 may be a lens that is second adjacent to the image side. The fifth lens 500 may be disposed between the fourth lens 400 and the image side. The fifth lens 400 may be disposed between the fourth lens 400 and the sixth lens 600. A lens may be additionally disposed between the fifth lens 500 and the fourth lens 400 or between the fifth lens 500 and the sixth lens 600.

The fifth lens 500 may have a positive refractive power. The fifth lens 500 may be formed to be convex on both sides. The object side surface of the fifth lens 500 may be formed be convex. The object side surface of the fifth lens 500 may be formed to be convex in the optical axis. The fifth lens 500 may comprise an object side surface having a convex shape. The fifth lens 500 may comprise an object side surface having a convex shape in the optical axis. The image side surface of the fifth lens 500 may be formed to be convex. The image side surface of the fifth lens 500 may be formed to be convex in the optical axis. The fifth lens 500 may comprise an image side surface having a convex shape. The fifth lens 500 may comprise an image side surface having a convex shape in the optical axis. The object side surface or the image side surface of the fifth lens 500 may comprise at least one inflection point. The object side surface of the fifth lens 500 may be formed to be more planar as it travels from the center toward the peripheral portion. The object side surface of the fifth lens 500 may be more protruded toward the object side as it travels from the peripheral portion to the outermost region. The image side surface of the fifth lens 500 may be more recessed toward the object side as it travels from the center toward the peripheral portion. The image side surface of the fifth lens 500 may be more protruded toward the image side as it travels from the peripheral portion toward the outermost region.

The radius of curvature of the object side surface of the fifth lens 500 may be a positive number. The radius of curvature in the optical axis of the object side surface of the fifth lens 500 may be a positive number. The radius of curvature of the image side surface of the fifth lens 500 may be a negative number. The radius of curvature in the optical axis of the image side surface of the fifth lens 500 may be a negative number. The absolute value of the radius of curvature of the object side surface of the fifth lens 500 may be greater than the absolute value of the radius of curvature of the image side surface of the fifth lens 500. The fifth lens 500 may be a solid lens.

Both surfaces of the fifth lens 500 may be formed in a spherical shape. Both surfaces of the fifth lens 500 may be formed of an aspherical surface. One surface of both surfaces of the fifth lens 500 may be formed as a spherical surface and the other surface may be formed as an aspherical surface.

The fifth lens 500 may be formed of a material having a refractive index. The fifth lens 500 may be formed of a material having the same refractive index as the first lens 100, the third lens 300, and the sixth lens 600. The fifth lens 500 may be formed of a material having a lower refractive index than that of the second lens 200.

The fifth lens 500 may satisfy a range of 1.5<N5<1.6. In addition, the fifth lens 500 may satisfy a range of 1.52<N5<1.58. N5 is the refractive index of the fifth lens 500. The fifth lens 500 may satisfy a range of 50<V5<60. In addition, the fifth lens 500 may satisfy a range of 52<V5<58. V5 is Abbe's number of the fifth lens 500.

The imaging lens may comprise a sixth lens 600. The sixth lens 600 may be the lens closest to the image side. The sixth lens 600 may be disposed between the fifth lens 500 and the image side. The sixth lens 600 may be disposed between the fifth lens 500 and the filter 700. A lens may be additionally disposed between the sixth lens 600 and the fifth lens 500 or between the sixth lens 600 and the filter 700.

The sixth lens 600 may have a negative refractive power. Both surfaces of the sixth lens 600 may be formed to be concave. The object side surface of the sixth lens 600 may be formed to be concave. The object side surface of the sixth lens 600 may be formed to be concave in the optical axis. The sixth lens 600 may comprise an object side surface having a concave shape. The sixth lens 600 may comprise an object side surface having a concave shape in the optical axis. The image side surface of the sixth lens 600 may be formed to be concave. The image side surface of the sixth lens 600 may be formed to be concave in the optical axis. The sixth lens 600 may comprise a concave image side surface. The sixth lens 600 may comprise an image side surface concave in the optical axis. The object side surface or the image side surface of the sixth lens 600 may comprise at least one inflection point. The object side surface of the sixth lens 600 may be more recessed toward the image side as it travels from the center toward the peripheral portion. The object side surface of the sixth lens 600 may more protruded toward the object side as it travels from the peripheral portion to the outermost region. The object side surface of the sixth lens 600 may be formed to be more planar as it travels from the peripheral portion toward the outermost region. The image side surface of the sixth lens 600 may be more protruded toward the image side as it travels from the center toward the peripheral portion. The image side surface of the sixth lens 600 may be more recessed toward the object side as it travels from the peripheral portion to the outermost region.

The radius of curvature of the object side surface of the sixth lens 600 may be a negative number. The radius of curvature of the object side surface of the sixth lens 600 in the optical axis may be a negative number. The radius of curvature of the image side surface of the sixth lens 600 may be a positive number. The radius of curvature of the image side surface of the sixth lens 600 in the optical axis may be a positive number. The absolute value of the radius of curvature of the object side surface of the sixth lens 600 may be greater than the absolute value of the radius of curvature of the image side surface of the sixth lens 600. The sixth lens 600 may be a solid lens.

Both surfaces of the sixth lens 600 may be formed in a spherical shape. Both surfaces of the sixth lens 600 may be formed of an aspherical surface. One surface of both surfaces of the sixth lens 600 may be formed as a spherical surface and the other surface may be formed as an aspherical surface. The sixth lens 600 may have a surface comprising one or more inflection points.

The sixth lens 600 may be formed of a material having a refractive index. The sixth lens 600 may be formed of a material having the same refractive index as the first lens 100, the third lens 300, and the fifth lens 500. The sixth lens 600 may be formed of a material having a lower refractive index than that of the second lens 200.

The sixth lens 600 may satisfy a range of 1.5<N6<1.6. In addition, the sixth lens 600 may satisfy a range of 1.52<N6<1.58. N6 is the refractive index of the sixth lens 600. The sixth lens 600 may satisfy a range of 50<V6<60. In addition, the sixth lens 600 may satisfy the range of 52<V6<58. V6 is Abbe's number of the sixth lens 600.

All lens surfaces of the first lens 100, the second lens 200, the third lens 300, the fifth lens 500, and the sixth lens 600 may be formed as spherical or aspherical surfaces. Both surfaces of each of the first lens 100, the second lens 200, the third lens 300, the fifth lens 500, and the sixth lens 600 may be formed to be spherical. Any one surface of the both surfaces of each of the first lens 100, the second lens 200, the third lens 300, the fifth lens 500, and the sixth lens 600 may be formed to be spherical and the other surface thereof may be formed to be aspherical.

The imaging lens may comprise a filter 700. The filter 700 may be disposed at the image side than the sixth lens 600. The filter 700 may be at least one of an infrared filter and a cover glass. When an infrared filter is applied as the filter 700, radiant heat emitted from external light may be blocked from being transmitted to the light receiving element. In addition, the infrared filter transmits visible light and reflects infrared light toward outside.

The imaging lens may comprise an image sensor 800. The image sensor 800 may comprise a charge coupled device (CCD) or a complementary metal oxide semiconductor (CMOS). A horizontal and/or vertical length of a unit pixel of the image sensor 800 may be 2 μm or less. Through this, it is possible to provide an imaging lens that can be applied to pixels and/or a camera module having a high number of pixels.

The imaging lens may comprise an iris STOP. The iris STOP may be disposed between the first lens 100 and the second lens 200. The iris STOP may be disposed closer to the first lens 100 than to the second lens 200. The iris STOP may be spaced apart from the object side surface of the second lens 200. The iris STOP may control the amount of light incident from the subject. The iris STOP may adjust the amount of light passing through the first lens 100. The iris STOP may adjust the amount of light incident to the second lens 200. The iris STOP may comprise a caliber iris.

The imaging lens may comprise a first lens group being disposed at an object side with respect to a variable focus lens (For example, a liquid lens) and a second lens group disposed at an image side with respect to the variable focus lens. Each of the first lens group and the second lens group may comprise at least one solid lens.

The cavity of the first plate in which the liquid of the liquid lens is disposed may have an inclined surface. Due to having the inclined surface, the diameter of the opening adjacent to the iris STOP of the cavity of the first plate of the liquid lens may be smaller than the diameter of the side distal from the iris STOP of the cavity of the first plate.

The imaging lens according to the first embodiment of the present invention may satisfy the following Conditional Expression 1 to Conditional Expression 47.

Conditional Expressions and embodiments described below are preferred embodiments for increasing the effect, and the present invention does not necessarily consist of the following conditions. For example, the configuration of the optical device of the present invention may have a synergistic effect even by satisfying only some Conditional Expressions among Conditional Expressions described below.

$$1.2 < d1/d2 < 1.8 \qquad \text{[Conditional Expression 1]}$$

In Conditional Expression 1, d1 means the distance between the first lens group and the second lens group on the optical axis (For example, the optical axis distance from the imaginary tangent at the apex of the image side of the third lens 300 to the imaginary tangent at the vertex of the object side of the fifth lens 500), and d2 means the thickness of the fourth lens 400 on the optical axis. In addition, Conditional Expression 1 may satisfy the range of 1.4<d1/d2<1.7.

$$0 < Fg1/|Fg2| < 0.5 \qquad \text{[Conditional Expression 2]}$$

In Conditional Expression 2, Fg1 means the composite focal length of the first lens group (For example, the first lens 100 to the third lens 300), and Fg2 means the composite focal length of the second lens group (For example, the fifth lens 500 to the sixth lens 600). In addition, Conditional Expression 2 may satisfy the range of 0.2<Fg1/|Fg2|<0.4.

$$0.1 < d1/TTL < 0.4 \qquad \text{[Conditional Expression 3]}$$

In Conditional Expression 3, d1 means the distance between the first lens group and the second lens group on the optical axis (For example, the optical axis distance from the imaginary tangent at the apex of the image side of the third lens 300 to the imaginary tangent at the vertex of the object side of the fifth lens 500), and TTL means the distance from the object side surface of the first lens 100 to the imaging plane on the optical axis). In addition, TTL may mean the distance from the object side surface of the lens closest to the object side to the imaging plane on the optical axis. In addition, Conditional Expression 3 may satisfy the range of $0.2<d1/TTL<0.3$.

$0.1<d1/\text{imgH}<0.4$      [Conditional Expression 4]

In Conditional Expression 4, d1 means the distance between the first lens group and the second lens group on the optical axis (For example, the optical axis distance from the imaginary tangent at the apex of the image side of the third lens 300 to the imaginary tangent at the vertex of the object side of the fifth lens 500), and imgH means the diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 4 may satisfy the range of $0.15<d1/\text{ImgH}<0.3$.

$0.8 \text{ mm}<d1<1.7 \text{ mm}$      [Conditional Expression 5]

In Conditional Expression 5, d1 means the distance between the first lens group and the second lens group on the optical axis (For example, the optical axis distance from the imaginary tangent at the apex of the image side of the third lens 300 to the imaginary tangent at the vertex of the object side of the fifth lens 500). In addition, Conditional Expression 5 may satisfy the range of $1.0 \text{ mm}<d1<1.5 \text{ mm}$.

$0.1<\text{THlg1}/TTL<0.4$      [Conditional Expression 6]

In Conditional Expression 6, THlg1 means the thickness of the first lens group on the optical axis (For example, the distance from the object side surface of the first lens 100 to the image side surface of the third lens 300 on the optical axis), and TTL means the distance from the object side surface of the first lens 100 to the imaging plane on the optical axis. In addition, Conditional Expression 6 may satisfy the range of $0.2<\text{THlg1}/TTL<0.3$.

$0.1<\text{THlg2}/TTL<0.5$      [Conditional Expression 7]

In Conditional Expression 7, THlg2 means the thickness of the second lens group on the optical axis (For example, the distance from the object side surface of the fifth lens 500 to the image side surface of the sixth lens 600 on the optical axis), and TTL means the distance from the object side surface of the first lens 100 to the imaging plane on the optical axis. In addition, Conditional Expression 7 may satisfy the range of $0.15<\text{THlg2}/TTL<0.3$.

$0.1<\text{THlg1}/\text{imgH}<0.4$      [Conditional Expression 8]

In Conditional Expression 8, THlg1 means the thickness of the first lens group on the optical axis (For example, the distance from the object side surface of the first lens 100 to the image side surface of the third lens 300 on the optical axis), and imgH means a diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 8 may satisfy the range of $0.15<\text{THlg1}/\text{ImgH}<0.3$.

$0.1<\text{THlg2}/\text{imgH}<0.4$      [Conditional Expression 9]

In Conditional Expression 9, THlg2 means the thickness of the second lens group on the optical axis (For example, the distance from the object side surface of the fifth lens 500 to the image side surface of the sixth lens 600 on the optical axis), and imgH means a diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 9 may satisfy the range of $0.15<\text{THlg2}/\text{imgH}<0.3$.

$0.5<\text{THlg1}/d1<1.5$      [Conditional Expression 10]

In Conditional Expression 10, THlg1 means the thickness of the first lens group on the optical axis (For example, the distance from the object side surface of the first lens 100 to the image side surface of the third lens 300 on the optical axis), and d1 means the distance between the first lens group and the second lens group on the optical axis (For example, the optical axis distance from the imaginary tangent at the apex of the image side of the third lens 300 to the imaginary tangent at the vertex of the object side of the fifth lens 500). In addition, Conditional Expression 10 may satisfy the range of $0.8<\text{THlg1}/d1<1.3$.

$1<\text{THlg1}/d2<2$      [Conditional Expression 11]

In Conditional Expression 11, THlg1 means the thickness of the first lens group on the optical axis (For example, the distance from the object side surface of the first lens 100 to the image side surface of the third lens 300 on the optical axis), and d2 means the thickness of the fourth lens 400 on the optical axis. In addition, Conditional Expression 11 may satisfy the range of $1.4<\text{THlg1}/d2<1.8$.

$0.5<\text{THlg2}/d1<1.5$      [Conditional Expression 12]

In Conditional Expression 12, THlg2 means the thickness of the second lens group on the optical axis (For example, the distance from the object side surface of the fifth lens 500 to the image side surface of the sixth lens 600 on the optical axis), and d1 means the distance between the first lens group and the second lens group on the optical axis (For example, the optical axis distance from the imaginary tangent at the apex of the image side of the third lens 300 to the imaginary tangent at the vertex of the object side of the fifth lens 500). In addition, Conditional Expression 12 may satisfy the range of $1.0<\text{THlg2}/d1<1.3$.

$1<\text{THlg2}/d2<2.3$      [Conditional Expression 13]

In Conditional Expression 13, THlg2 means the thickness of the second lens group on the optical axis (for example, the distance from the object side surface of the fifth lens 500 to the image side surface of the sixth lens 600 on the optical axis), and d2 means the thickness of the fourth lens 400 on the optical axis. In addition, Conditional Expression 13 may satisfy the range of $1.5<\text{THlg2}/d2<2.1$.

$0.5<TTL/D\_inf<5$      [Conditional Expression 14]

In Conditional Expression 30, TTL means the distance from the object side surface of the first lens 100 to the imaging plane on the optical axis, and D_inf means a value obtained by dividing 1000 mm by the focal length of the fourth lens 400 at the object distance of infinity. In addition, Conditional Expression 14 may satisfy the range of 0<TTL/|D_inf|<3.

$$0.1 < TTL/|D\_macro| < 0.4 \quad \text{[Conditional Expression 15]}$$

In Conditional Expression 15, TTL means the distance from the object side surface of the first lens 100 to the imaging plane on the optical axis, and D_macro means a value obtained by dividing 1000 mm by the focal length of the fourth lens 400 at the object distance of 10 cm. In addition, Conditional Expression 15 may satisfy the range of 0.15<TTL/|D_macro|<0.3.

$$0.5 < \text{imgH}/|D\_inf| < 5 \quad \text{[Conditional Expression 16]}$$

In Conditional Expression 16, imgH means a diagonal length of the imaging plane of the image sensor 800, and D_inf means a value obtained by dividing 1000 mm by the focal length of the fourth lens 400 at the object distance of infinity. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 16 may satisfy the range of 0<imgH/|D_inf|<5.

$$0.1 < \text{imgH}/|D\_macro| < 0.4 \quad \text{[Conditional Expression 17]}$$

In Conditional Expression 17, imgH means the diagonal length of the imaging plane of the image sensor 800, and D_macro means a value obtained by dividing 1000 mm by the focal length of the fourth lens 400 at the object distance of 10 cm. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression may satisfy the range of 0.2<ImgH/|D_mac|<0.4.

$$0.6 < F\_macro/F\_inf < 1 \quad \text{[Conditional Expression 18]}$$

In Conditional Expression 18, F_macro means the total focal length at the object distance of 10 cm, and F_inf means the total focal length at the object distance infinity. In addition, Conditional Expression 18 may satisfy the range of 0.8<F_macro/F_inf<1.

$$0.5 < Fno/|D\_inf| < 2.0 \quad \text{[Conditional Expression 19]}$$

In Conditional Expression 19, Fno means the F-number of the entire optical system, and D_inf means a value obtained by dividing 1000 mm by the focal length of the fourth lens 400 at the object distance of infinity. In addition, Conditional Expression may satisfy the range of 1.0<Fno/|D_inf|<1.3.

$$0 < Fno/|D\_macro| < 0.4 \quad \text{[Conditional Expression 20]}$$

In Conditional Expression 20, Fno means the F-number of the entire optical system, and D_macro means a value obtained by dividing 1000 mm by the focal length of the fourth lens 400 at the object distance of 10 cm. In addition, Conditional Expression 20 satisfy the range of 0<Fno/|D_macro|<0.2.

$$1 < Fno/d1 < 3 \quad \text{[Conditional Expression 21]}$$

In Conditional Expression 21, Fno means the F-number of the entire optical system, and d1 is the distance between the first lens group and the second lens group on the optical axis (For example, the optical axis distance from the apex of the image side surface of the third lens 300 to the apex of the object side surface of the fifth lens 500). In addition, Conditional Expression 21 may satisfy the range of 1.5<Fno/d1<2.2.

$$0.5 < Fg1/TTL < 2 \quad \text{[Conditional Expression 22]}$$

In Conditional Expression 22, Fg1 means the composite focal length of the first lens group (For example, the first lens 100 to the third lens 300), and TTL means the distance from the object side surface of the first lens 100 to the imaging plane on the optical axis. In addition, Conditional Expression 22 may satisfy the range of 0.8<Fg1/TTL<1.2.

$$|Fg2|/TTL > 1 \quad \text{[Conditional Expression 23]}$$

In Conditional Expression 23, Fg2 means the composite focal length of the second lens group (For example, the fifth lens 500 to the sixth lens 600), and TTL means the distance from the object side surface of the first lens 100 to the imaging plane on the optical axis. In addition, Conditional Expression 23 may satisfy the range of |Fg2|/TTL>1.5.

$$0.5 < Fg1/\text{imgH} < 1.2 \quad \text{[Conditional Expression 24]}$$

In Conditional Expression 24, Fg1 means the composite focal length of the first lens group (For example, the first lens 100 to the third lens 300), and imgH means the diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 24 may satisfy the range of 0.6<Fg1/imgH<1.0.

$$|Fg2|/\text{imgH} > 1.0 \quad \text{[Conditional Expression 25]}$$

In Conditional Expression 25, Fg2 means the composite focal length of the second lens group (For example, the fifth lens 500 to the sixth lens 600), and imgH means the diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 25 may satisfy the range of |Fg2|/imgH>1.3.

$$0 < f1/L1R1 < 5 \quad \text{[Conditional Expression 26]}$$

In Conditional Expression 26, f1 means the focal length of the first lens 100, and L1R1 means the radius of curvature of the object side surface of the first lens 100. In addition, Conditional Expression 26 may satisfy the range of 0<f1/L1R1<3.

$$0 < L2R2/|f2| < 1 \quad \text{[Conditional Expression 27]}$$

In Conditional Expression 27, L2R2 means a radius of curvature of the image side surface of the second lens 200, and f2 means a focal length of the second lens 200. In addition, Conditional Expression 27 may satisfy the range of 0<L2R2/|f2|<0.5.

$$1.0 < Fg1/f1 < 2.0 \quad \text{[Conditional Expression 28]}$$

In Conditional Expression 28, Fg1 means a composite focal length of the first lens group (For example, the first lens 100 to the third lens 300), and f1 means a focal length of the first lens 100. In addition, Conditional Expression 28 may satisfy the range of 1.0<Fg1/f1<1.5.

$$0<Fg1/|f2|<2 \quad \text{[Conditional Expression 29]}$$

In Conditional Expression 29, Fg1 means a composite focal length of the first lens group (For example, the first lens 100 to the third lens 300), and f2 means a focal length of the second lens 200. In addition, Conditional Expression 29 may satisfy the range of 0.5<Fg1/|f2|<1.5.

$$0<Fg1/L1R1<5 \quad \text{[Conditional Expression 30]}$$

In Conditional Expression 30, Fg1 means a composite focal length of the first lens group (For example, the first lens 100 to the third lens 300), and L1R1 means a radius of curvature of the object side surface of the first lens 100. In addition, Conditional Expression 30 may satisfy the range of 1.0<Fg1/L1R1<3.5.

$$1<Fg1/L2R2<10 \quad \text{[Conditional Expression 31]}$$

In Conditional Expression 31, Fg1 means a composite focal length of the first lens group (For example, the first lens 100 to the third lens 300), and L2R2 means a radius of curvature of the image side surface of the second lens 200. In addition, Conditional Expression 31 may satisfy the range of 2<Fg1/L2R2<5.

$$|Fg2|/f1>1 \quad \text{[Conditional Expression 32]}$$

In Conditional Expression 32, Fg2 means a composite focal length of the second lens group (For example, the fifth lens 500 to the sixth lens 600), and f1 means a focal length of the first lens 100. In addition, Conditional Expression 32 may satisfy the range of |Fg2|/f1>2.

$$|Fg2|/|f2|>0.5 \quad \text{[Conditional Expression 33]}$$

In Conditional Expression 33, Fg2 a composite focal length of the second lens group (For example, the fifth lens 500 to the sixth lens 600), and f2 is the focal length of the second lens 200. In addition, Conditional Expression 33 may satisfy the range of |Fg2|/|f2|>1.0.

$$|Fg2|/L1R1>2 \quad \text{[Conditional Expression 34]}$$

In Conditional Expression 34, Fg2 means a composite focal length of the second lens group (For example, the fifth lens 500 to the sixth lens 600), and L1R1 means a radius of curvature of the object side surface of the first lens 100. In addition, Conditional Expression 34 may satisfy the range of |Fg2|/L1R1>4.

$$|Fg2|/L2R2>3 \quad \text{[Conditional Expression 35]}$$

In Conditional Expression 35, Fg2 means a composite focal length of the second lens group (For example, the fifth lens 500 to the sixth lens 600), and L2R2 means a radius of curvature of the image side surface of the second lens 200. In addition, Conditional Expression 35 may satisfy the range of |Fg2|/L2R2>5.

$$0<\tan(DFOV/2)/|D\_inf|<0.8 \quad \text{[Conditional Expression 36]}$$

In Conditional Expression 36, the DFOV means the twice the angle formed by the light incident from the object side to the maximum image height with the optical axis, and D_inf means the value obtained by dividing 1000 mm by the focal length of the fourth lens 400 at the object distance of infinity. In addition, Conditional Expression 36 may satisfy the range of 0<tan(DFOV/2)/|D_inf|<0.5.

$$0<\tan(DFOV/2)/|D\_macro|<0.5 \quad \text{[Conditional Expression 37]}$$

In Conditional Expression 37, the DFOV means twice the angle formed by the light incident from the object side to the maximum image height with the optical axis, and D_macro means the value obtained by dividing 1000 mm by the focal length of the fourth lens 400 at the object distance of 10 cm. In addition, Conditional Expression 37 may satisfy the range of 0<tan(DFOV/2)/|D_macro|<0.2.

$$1.5<G1<1.6 \quad \text{[Conditional Expression 38]}$$

In Conditional Expression 38, G1 means the refractive index of the material of the first lens 100. In addition, G1 may mean a refractive index at a wavelength of 587 nm. In addition, Conditional Expression 38 may satisfy the range of 1.53<G1<1.58.

$$30<V1<60 \quad \text{[Conditional Expression 39]}$$

In Conditional Expression 39, V1 means Abbe's number of the first lens 100. In addition, Conditional Expression 39 may satisfy the range of 50<V1<60.

$$|L1R2|/L1R1>2 \quad \text{[Conditional Expression 40]}$$

In Conditional Expression 40, L1R2 means the radius of curvature of the image side surface of the first lens 100, and L1R1 means the radius of curvature of the object side surface of the first lens 100. In addition, Conditional Expression 40 may satisfy the range of 0<|L1R2|/L1R1<4.

$$0.7<TTL/\text{imgH}<1 \quad \text{[Conditional Expression 41]}$$

In Conditional Expression 41, TTL means the distance from the object side surface of the first lens 100 to the imaging plane on the optical axis, and imgH means the diagonal length of the imaging plane of the image sensor 800. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800. In addition, Conditional Expression 41 may satisfy the range of 0.5<TTL/imgH<0.9. In addition, Conditional Expression 41 may satisfy the range of TTL/imgH<0.75.

$$0.5<F\_inf/TTL<1.5 \quad \text{[Conditional Expression 42]}$$

In Conditional Expression 42, F_inf means the total focal length at the object distance of infinity, and TTL means the distance from the object side surface of the first lens 100 to the imaging plane on the optical axis. In addition, Conditional Expression 42 may satisfy the range of 0.6<F_inf/TTL<1.0.

$$0.5<F\_macro/TTL<1 \quad \text{[Conditional Expression 43]}$$

In Conditional Expression 43, F_macro means the total focal length at the object distance of 10 cm, and TTL means the distance from the object side surface of the first lens 100 to the imaging plane on the optical axis. In addition, Conditional Expression 43 may satisfy the range of 0.6<F_macro/TTL<0.8.

$$0.5<F\_inf/f1<2 \quad \text{[Conditional Expression 44]}$$

In Conditional Expression 44, F_inf means the total focal length at the object distance of infinity, and f1 means the focal length of the first lens 100. In addition, Conditional Expression 44 may satisfy the range of 0.8<F_inf/f1<1.5.

$$0.5<F\_macro/f1<2 \quad \text{[Conditional Expression 45]}$$

In Conditional Expression 45, F_macro means the entire focal length at the object distance of 10 cm, and f1 means the focal length of the first lens 100. In addition, Conditional Expression 45 may satisfy the range of 0.8<F_macro/f1<1.5.

$$0.2<F\_inf/|f2|<1.5 \quad \text{[Conditional Expression 46]}$$

In Conditional Expression 46, F_inf means the entire focal length at the object distance of infinity, and f2 means the focal length of the second lens 200. In addition, Conditional Expression 46 may satisfy the range of 0.4<F_inf/|f2|<1.0.

$$0.2 < F\_macro/|f2| < 1.0 \qquad \text{[Conditional Expression 47]}$$

In Conditional Expression 47, F_macro means the entire focal length at the object distance of 10 cm, and f2 means the focal length of the second lens 200. In addition, Conditional Expression 47 may satisfy the range of 0.4<F_macro/|f2|<0.8.

The aspherical surface mentioned hereinafter can be obtained from Equation 1. E used for the conic constant k and the aspherical coefficients A, B, C, D, E, and F, and the number that follows, represent a power of ten. For example, E+01 represents $10^1$, and E–02 represents $10^{-2}$.

$$Z = \frac{cY^2}{1+\sqrt{1-(1+K)c^2Y^2}} + AY^4 + BY^6 + CY^8 + DY^{10} + EY^{12} + FY^{14} + \ldots \qquad \text{[Equation 1]}$$

Here, z means the distance from the vertex of the lens in the optical axis direction. c means the basic curvature of the lens. Y denotes a distance in a direction perpendicular to the optical axis. K stands for Conic constant. A, B, C, D, and E represent aspheric coefficients.

TABLE 1

| Surface | Radius | Thickness | Index | Abbe # |
|---|---|---|---|---|
| 1* | 1.9637 | 0.4841 | 1.5441 | 56.115 |
| 2* | −26.0712 | 0.0300 | | |
| Stop | Infinity | 0.0200 | | |
| 3* | 2.1683 | 0.2000 | 1.6714 | 19.238 |
| 4* | 1.3302 | 0.1870 | | |
| 5* | 41.2782 | 0.2831 | 1.5441 | 56.115 |
| 6* | −6.1688 | 0.0200 | | |
| 7 | Infinity | | | |
| 8 | Infinity | | | |
| 9 | −55.6000 | | | |
| 10 | Infinity | | | |
| 11 | Infinity | 0.4412 | | |
| 12* | 19.9639 | 0.5618 | 1.5441 | 56.115 |
| 13* | −2.8413 | 0.5853 | | |
| 14* | −7.6176 | 0.3341 | 1.5441 | 56.115 |
| 15* | 1.7143 | 0.1501 | | |
| 16 | Infinity | 0.1100 | 1.523 | 54.5 |
| 17 | Infinity | 0.5114 | | |

Table 1 shows the surface number (Surface), the radius of curvature (Radius), the center thickness of each lens or the distance between the lens surfaces (Thickness), refractive index (Index), Abbe's number (Abbe #) of an imaging lens according to a first embodiment of the present invention. In this case, the unit of the radius of curvature and the thickness or distance may be mm. ASP may mean an aspheric surface. SPH may mean a spherical surface.

TABLE 2

| | 1* | 2* | 3* | 4* | 5* |
|---|---|---|---|---|---|
| K | 0.396079444 | 364.0597177 | 0.21364504 | −0.07524115 | 2661.05803 |
| A | −0.00415507 | −0.00204105 | −0.3288641 | −0.35589774 | −0.0244034 |
| B | 9.111116771 | 0.58564845 | 1.95642743 | 0.931572291 | 0.315462923 |
| D | −0.88691749 | −1.70430816 | −14.9954053 | −5.41654165 | −1.65358177 |
| E | 4.45584629 | 2.535594292 | 91.85193485 | 35.1122106 | 14.19530569 |
| F | −12.8842596 | −4.16900083 | −389.250898 | −167.618634 | −67.5879553 |
| G | 22.912932 | 22.87184721 | 1059.494834 | 504.2726393 | 196.8218072 |
| H | −24.513361 | −72.0633682 | −1763.84053 | −907.304521 | −337.525196 |
| I | 14.48936289 | 99.87381699 | 1628.975203 | 887.2979328 | 310.2019512 |
| J | −3.6266525 | −51.3792076 | −638.013246 | −362.157984 | −118.253666 |

| | 6* | 12* | 13* | 14* | 15* |
|---|---|---|---|---|---|
| K | −69.0838595 | 52.5178666 | 1.298533102 | 11.38886393 | −5.448279 |
| A | −0.05295462 | 0.018002147 | 0.086466529 | −0.27143415 | −0.21504334 |
| B | 0.103328115 | −0.09649953 | −0.10630499 | 0.149526325 | 0.163496493 |
| D | 0.122010609 | 0.239346254 | 0.152140725 | −0.03970067 | −0.08774812 |
| E | −1.11560435 | −0.46764988 | −0.15531437 | −0.01411056 | 0.030154394 |
| F | 8.404812026 | 0.593289753 | 0.10936311 | 0.026640926 | −0.00605868 |
| G | −28.2545476 | −0.48223532 | −0.04930395 | −0.01404981 | 0.00056584 |
| H | 51.94653658 | 0.240774511 | 0.013498628 | 0.003611487 | 8.63E−06 |
| I | −48.5891717 | −0.06733015 | −0.00206257 | −0.00046381 | −5.89E−06 |
| J | 17.93532563 | 0.008040626 | 0.000136499 | 2.39E−05 | 3.2446E−07 |

Table 2 shows the values of the aspheric coefficient and the conic constant k of each lens surface of an imaging lens according to a first embodiment of the present invention.

TABLE 3

|  | First embodiment |
| --- | --- |
| imgH | 6.4 |
| F_inf | 3.852 |
| F_macro | 3.61 |
| D_inf | 2.02 |
| D_macro | 19.5 |
| Fg1 | 4.27 |
| Fg2 | -9.23 |
| TTL | 4.64 |
| Fno | 2.45 |
| DFOV | 78.2 |
| G1 | 1.5441 |
| V1 | 56.1 |
| d1 | 1.183 |
| d2 | 0.722 |
| THIg1 | 1.204 |
| THIg2 | 1.481 |
| f1 | 3.365 |
| f2 | -5.62 |
| L1R1 | 1.964 |
| L2R2 | 1.33 |
| L1R2 | -26.071 |

Table 3 shows the characteristics of the imaging lens according to a first embodiment of the present invention. imgH means the diagonal length of the imaging plane of the image sensor 800. In addition, imgH may mean twice the distance from the optical axis of the upper surface to the maximum image height in the vertical direction. In addition, imgH may mean a diagonal length of the effective area 810 of the imaging plane of the image sensor 800. Here, the effective area 810 may mean a light receiving area on the image sensor 800. F_inf means the total focal length at the object distance of infinity, F_macro means the total focal length at the object distance of 10 cm, D_inf means a value obtained by dividing 1000 mm by the focal length of the fourth lens 400 at the object distance of infinity, D_macro means a value obtained by dividing 1000 mm by the focal length of the fourth lens 400 at the object distance of 10 cm, Fg1 means the composite focal length of the first lens group (For example, the first lens 100 to the third lens 300), Fg2 means the composite focal length of the second lens group (For example, the fifth lens 500 to the sixth lens 600), TTL means the distance from the object side surface of the first lens 100 to the imaging plane on the optical axis, Fno means the F-number of the entire optical system, DFOV means twice the angle formed by the light incident from the object side to the maximum image height with the optical axis, G1 means the refractive index of the first lens 100 at 587 nm, V1 means Abbe's number of the first lens 100, d1 means the distance between the first lens group and the second lens group on the optical axis (For example, the optical axis distance from the imaginary tangent at the apex of the image side of the third lens 300 to the imaginary tangent at the vertex of the object side of the fifth lens 500), d2 means the thickness of the fourth lens 400 on the optical axis, THIg1 means the thickness of the first lens group on the optical axis (For example, the distance from the object side surface of the first lens 100 to the image side surface of the third lens 300 on the optical axis), THIg2 means the thickness of the second lens group on the optical axis (for example, the distance from the object side surface of the fifth lens 500 to the image side surface of the sixth lens 600 on the optical axis), f1 means the focal length of the first lens 100, f2 means the focal length of the second lens 200, L1R1 means the radius of curvature of the object side surface of the first lens 100, L2R1 means the radius of curvature of the object side surface of the second lens 200, and L1R2 means a radius of curvature of the image side surface of the first lens 100. At this time, the unit of imgH, F_inf, F_macro, Fg1, Fg2, TTL, Fno, d1, d2, THIg1, THIg2, f1, f2, L1R1, L2R1, and L1R2 may be mm.

Hereinafter, the concept of the diagonal field of view (DFOV) of the imaging lens according to the present embodiment will be described with reference to the drawings.

Figure 4:
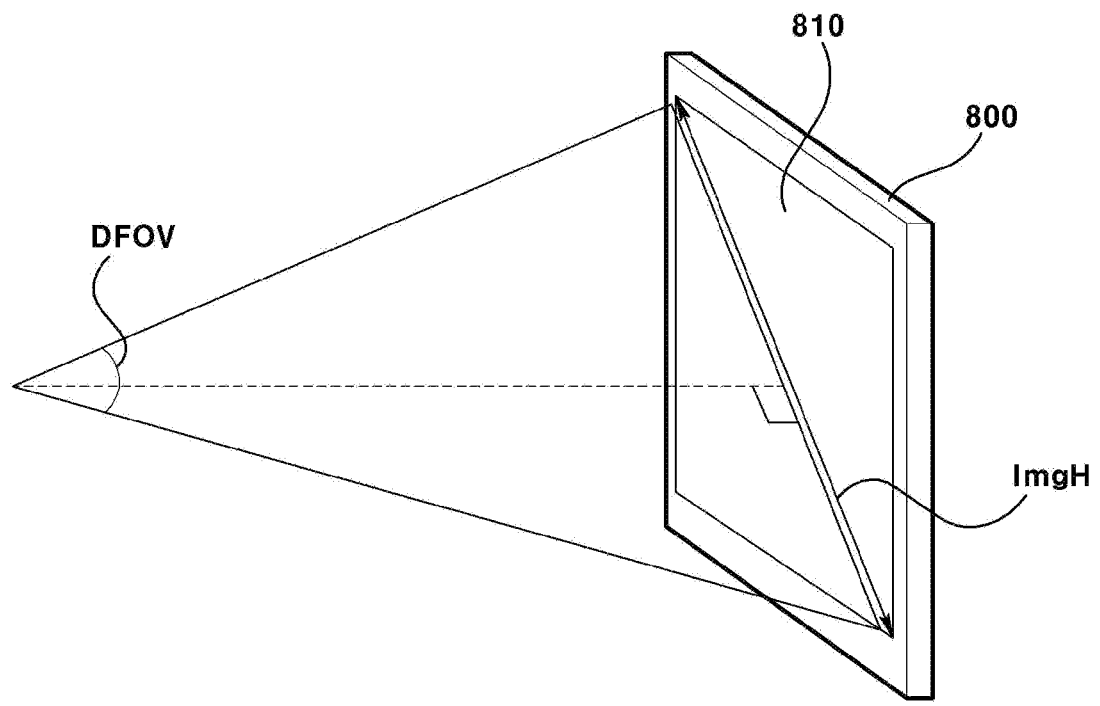
FIG. 4 is a conceptual diagram of a diagonal field of view (DFOV) of an imaging lens according to the present embodiment.

FIG. 4 is a conceptual diagram of a diagonal field of view (DFOV) of an imaging lens according to the present embodiment.

At this time, the FOV may be a diagonal FOV (DFOV). The diagonal field of view (DFOV) may be distinguished from a horizontal field of view (HFOV) and a vertical field of view (VFOV). For example, the horizontal field of view HFOV may be 0.8 times the diagonal field of view DFOV. In addition, the field of view (FOV) may be distinguished from the half field of view (HFOV). The field of view (FOV) may mean the diameter of a virtual circle connecting four vertices of the image sensor, and the half field of view (HFOV) may mean the radius of the aforementioned virtual circle. That is, the field of view FOV may be twice the half field of view HFOV.

The diagonal field of view (DFOV) can be calculated through the Equation below.

$$DFOV = 2*\arctan(imgH/(2*F)) \quad \text{[Equation]}$$

Here, imgH means a diagonal length of the imaging plane of the image sensor 800, and F means an effective focal length of the optical system. In addition, imgH may mean twice the distance from the optical axis of the imaging plane to the maximum image height in the vertical direction. In addition, imgH may be equal to the diagonal length of the effective area 810 of the image sensor 800. Here, the effective area 810 may mean a light receiving area on the image sensor 800.

Hereinafter, the configuration of the imaging lens according to a second embodiment of the present invention will be described with reference to the drawings.

Figure 2:
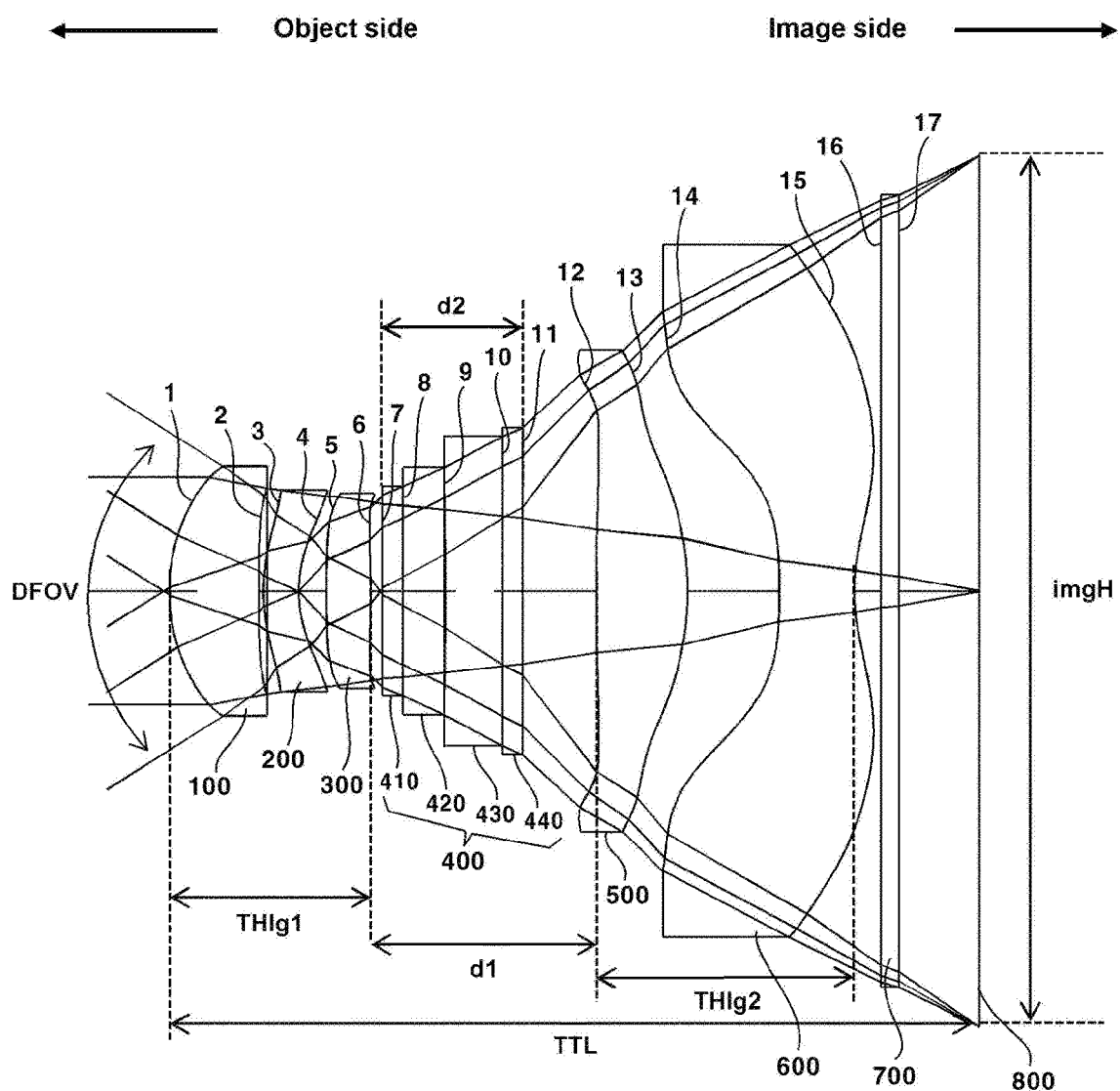
FIG. 2 is a block diagram of an imaging lens according to a second embodiment of the present invention.

FIG. 2 is a block diagram of an imaging lens according to a second embodiment of the present invention.

The imaging lens according to a second embodiment of the present invention may comprise a plurality of lenses. The imaging lens may comprise a six-element lens. The imaging lens may comprise a first lens 100, a second lens 200, a third lens 300, a fourth lens 400, a fifth lens 500, a sixth lens 600, and an iris STOP. However, in the imaging lens according to the second embodiment, any one or more of the first lens 100, the second lens 200, a third lens 300, the fourth lens 400, the fifth lens 500, the sixth lens 600, and the iris STOP may be omitted. The imaging lens may be disposed sequentially from the object side to the image side in the order of the first lens 100, the second lens 200, a third lens 300, the fourth lens 400, the fifth lens 500, and the sixth lens 600. The imaging lens according to a second embodiment may be composed of 5 or less lenses. Or, the imaging lens according to a second embodiment may be composed of seven or more lenses.

In another embodiment, any one or more of another lens, a flat plate, and an optical member may be added between the first lens 100 to the sixth lens 600. In addition, any one or more of another lens, a flat plate, and an optical member may be added in front of the first lens 100 or at the rear of the sixth lens 600. In addition, any one or more of other lenses, flat plates, and optical members may be added between the iris STOP and the lens, between the lens and the filter 700, and between the filter 700 and the image sensor 800. At this time, the filter 700 may be a flat lens. The refractive power of the flat lens may be '0'. The flat lens may have no refractive power. In addition, a filter layer may be disposed between the iris STOP and the lens, between the lens and the filter 700, and between the filter 700 and the image sensor 800. In this case, the filter layer can be coated to become a filter.

The first lens 100 according to a second embodiment may have a positive refractive power. The object side surface of the first lens 100 may be formed to be convex. The object side surface of the first lens 100 may be formed to be convex in the optical axis. The first lens 100 may comprise an object side surface having a convex shape. The first lens 100 may comprise an object side surface having a convex shape in the optical axis. The image side surface of the first lens 100 may be formed to be concave. The image side surface of the first lens 100 may be formed to be concave in the optical axis. The first lens 100 may comprise an image side surface having a concave shape. The first lens 100 may comprise an image side surface having a concave shape in the optical axis. The first lens 100 may be formed in a meniscus shape in which an object side surface is convex. The first lens 100 may be formed in a meniscus shape in which an object side surface is convex in the optical axis. The object side surface or the image side surface of the first lens 100 may comprise at least one inflection point.

The radius of curvature of the object side surface of the first lens 100 may be a positive number. The radius of curvature of the object side surface of the first lens 100 in the optical axis may be a positive number. The radius of curvature of the image side surface of the first lens 100 may be a positive number. The radius of curvature of the image side surface of the first lens 100 in the optical axis may be a positive number. The radius of curvature of the object side surface of the first lens 100 may be smaller than the radius of curvature of the image side surface of the first lens 100. The first lens 100 may be a solid lens.

The imaging lens according to the second embedment uses the same reference numerals for the radius of curvature, the center thickness of each lens or the distance between the lens surfaces, the refractive index, Abbe's number, and the same parts in the imaging lens according to the first embodiment, and the description is omitted. For the omitted part of the description of the imaging lens according to the second embodiment, the description of the imaging lens according to the first embodiment may be applied by analogy.

TABLE 4

| Surface | Radius | Thickness | Index | Abbe # |
|---|---|---|---|---|
| 1* | 1.9054 | 0.5383 | 1.5441 | 56.115 |
| 2* | 63.2777 | 0.0500 | | |
| Stop | Infinity | −0.0200 | | |
| 3* | 1.9213 | 0.2114 | 1.6714 | 19.238 |
| 4* | 1.2818 | 0.1690 | | |
| 5* | 52.2264 | 0.2649 | 1.5441 | 56.115 |
| 6* | −8.1365 | 0.0718 | | |
| 7 | Infinity | | | |
| 8 | Infinity | | | |
| 9 | −56.5000 | | | |
| 10 | Infinity | | | |
| 11 | Infinity | 0.4467 | | |
| 12* | 23.2361 | 0.5480 | 1.5441 | 56.115 |
| 13* | −2.9546 | 0.5537 | | |
| 14* | −8.3646 | 0.4510 | 1.5441 | 56.115 |
| 15* | 1.8747 | 0.1586 | | |
| 16 | Infinity | 0.1100 | 1.523 | 54.5 |
| 17 | Infinity | 0.4859 | | |

Table 4 shows the surface number (Surface), the radius of curvature (Radius), the center thickness of each lens or the distance between the lens surfaces (Thickness), the refractive index (Index), Abbe's number (Abbe #) of the imaging lens according to the second embodiment of the present invention. At this time, the unit of the radius of curvature and the thickness or distance may be mm. ASP may mean an aspheric surface. SPH may mean a spherical surface.

TABLE 5

| | 1* | 2* | 3* | 4* | 5* |
|---|---|---|---|---|---|
| K | 0.610052779 | 5356.113409 | −0.50526678 | −0.1569541 | 3880.444991 |
| A | −0.00509358 | 0.118681424 | −0.10368333 | −0.1995528 | 0.101980785 |
| B | 0.137527645 | −0.2432923 | −0.22780273 | −0.21353105 | 0.120237072 |
| D | −0.69776453 | 1.371006402 | 2.110964116 | 4.04735006 | 1.039127634 |
| E | 2.206676768 | −7.06908409 | −16.1447429 | −30.2782262 | −6.39929369 |
| F | −3.82230642 | 26.85002537 | 71.25896915 | 125.8451519 | 25.31187247 |
| G | 3.399356551 | −66.2075905 | −191.235619 | −315.075053 | −58.6186202 |
| H | −0.76689532 | 101.0402643 | 305.6467779 | 467.1967288 | 75.53418056 |
| I | −0.91597491 | −86.5524673 | −266.197823 | −378.874167 | −51.5980697 |
| J | 0.525855188 | 32.06117602 | 97.30919168 | 129.9190153 | 14.86247661 |

| | 6* | 12* | 13* | 14* | 15* |
|---|---|---|---|---|---|
| K | −1715.21398 | 178.6935467 | 1.25286058 | 11.88356375 | −5.9018069 |
| A | −0.25989213 | −0.00896678 | 0.026291135 | −0.23520339 | −0.15469392 |
| B | 2.543559068 | 0.042931562 | −0.04310881 | 0.06919316 | 0.087374234 |
| D | −14.6083631 | −0.18693805 | 0.058651661 | −0.00596065 | −0.03810599 |
| E | 62.67830321 | 0.333378062 | −0.07455122 | 0.013017839 | 0.012133865 |
| F | −179.171038 | −0.32687381 | 0.082920722 | −0.00783658 | −0.00255501 |
| G | 333.3263351 | 0.192630734 | −0.05093627 | 0.001622446 | 0.00032408 |
| H | −381.421555 | −0.06819907 | 0.016551086 | −7.48E−05 | −2.17E−05 |
| I | 241.222304 | 0.013257568 | −0.00273005 | −1.53E−05 | 5.35E−07 |
| J | −64.1185534 | −0.0010781 | 0.000181786 | 1.52E−06 | 4.8815E−09 |

Table 5 shows the values of the aspheric coefficient and the conic constant (k) of each lens surface of the imaging lens according to the second embodiment of the present invention.

TABLE 6

|  | Second embodiment |
| --- | --- |
| imgH | 6.768 |
| F_inf | 4.038 |
| F_macro | 3.774 |
| D_inf | 2 |
| D_macro | 20.5 |
| Fg1 | 4.53 |
| Fg2 | −10.72 |
| TTL | 4.88 |
| Fno | 2.27 |
| DFOV | 78.0 |
| G1 | 1.5441 |
| V1 | 56.1 |
| d1 | 1,358 |
| d2 | 0.84 |
| THIg1 | 1.213 |
| THIg2 | 1.552 |
| f1 | 3.583 |
| f2 | −6.542 |
| L1R1 | 1.905 |
| L2R2 | 1.281 |
| L1R2 | 63.277 |

Table 6 shows the characteristics of the imaging lens according to a second embodiment of the present invention.

Hereinafter, the configuration of the imaging lens according to a third embodiment of the present invention will be described with reference to the drawings.

Figure 3:
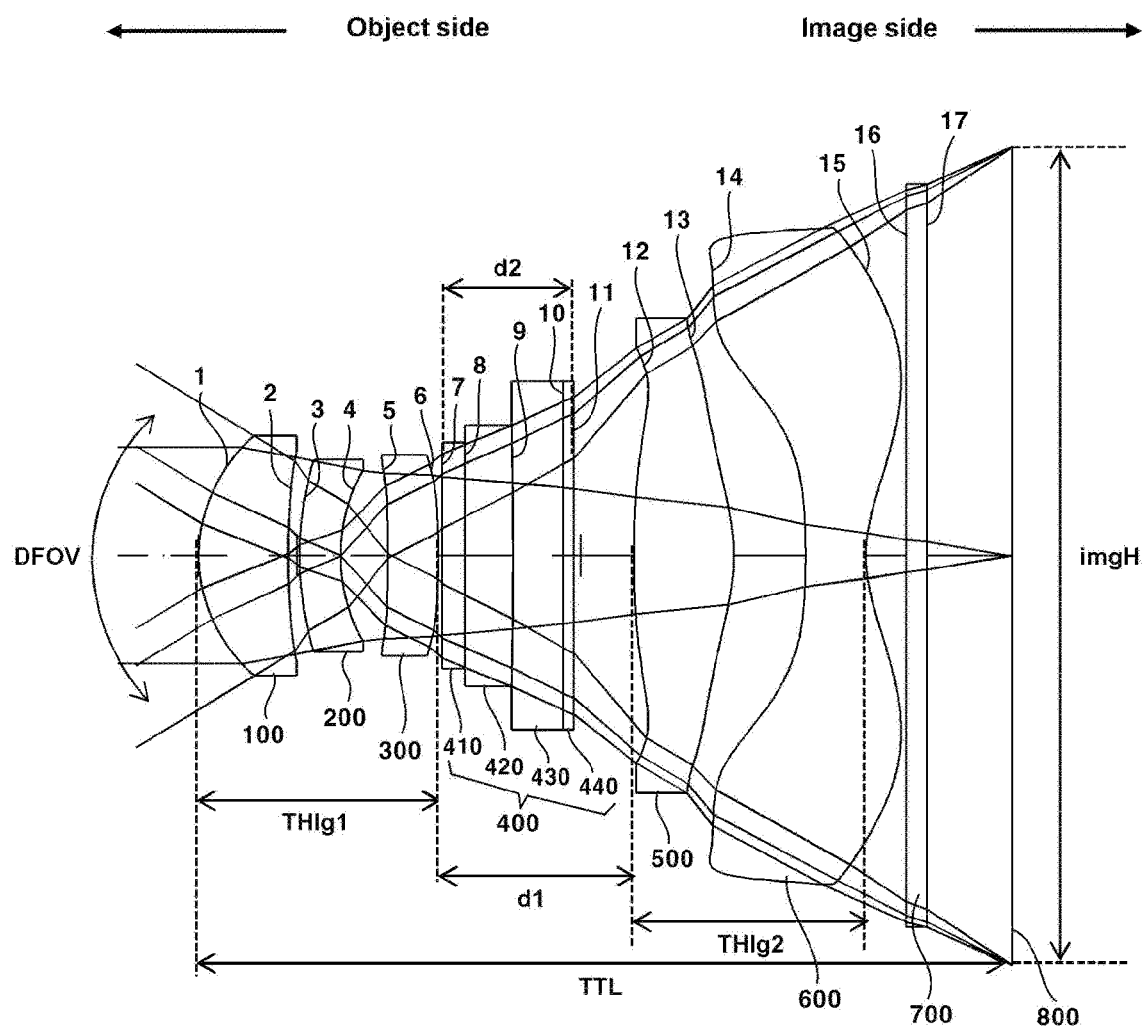
FIG. 3 is a block diagram of an imaging lens according to a third embodiment of the present invention.

FIG. 3 is a block diagram of an imaging lens according to a third embodiment of the present invention.

The imaging lens according to a third embodiment of the present invention may comprise a plurality of lenses. The imaging lens may comprise a six-element lens. The imaging lens may comprise a first lens 100, a second lens 200, a third lens 300, a fourth lens 400, a fifth lens 500, a sixth lens 600, and an iris STOP. However, in the imaging lens according to the second embodiment, any one or more of the first lens 100, the second lens 200, the third lens 300, the fourth lens 400, the fifth lens 500, the sixth lens 600, and the iris STOP may be omitted. The imaging lens may be disposed sequentially from the object side to the image side in the order of the first lens 100, the second lens 200, the third lens 300, the fourth lens 400, the fifth lens 500, and the sixth lens 600. The imaging lens according to a third embodiment may be composed of 5 or less lenses. Or, the imaging lens according to a third embodiment may be composed of seven or more lenses.

In another embodiment, any one or more of another lens, a flat plate, and an optical member may be added between the first lens 100 to the sixth lens 600. In addition, any one or more of another lens, a flat plate, and an optical member may be added in front of the first lens 100 or at the rear of the sixth lens 600. In addition, any one or more of other lenses, flat plates, and optical members may be added between the iris STOP and the lens, between the lens and the filter 700, and between the filter 700 and the image sensor 800. At this time, the filter 700 may be a flat lens. The refractive power of the flat lens may be '0'. The flat lens may have no refractive power. In addition, a filter layer may be disposed between the iris STOP and the lens, between the lens and the filter 700, and between the filter 700 and the image sensor 800. In this case, the filter layer can be coated to become a filter.

The first lens 100 according to a third embodiment may have a positive refractive power. The object side surface of the first lens 100 may be formed to be convex. The object side surface of the first lens 100 may be formed to be convex in the optical axis. The first lens 100 may comprise an object side surface having a convex shape. The first lens 100 may comprise an object side surface having a convex shape in the optical axis. The image side surface of the first lens 100 may be formed to be concave. The image side surface of the first lens 100 may be formed to be concave in the optical axis. The first lens 100 may comprise an image side surface having a concave shape. The first lens 100 may comprise an image side surface having a concave shape in the optical axis. The first lens 100 may be formed in a meniscus shape in which an object side surface is convex. The first lens 100 may be formed in a meniscus shape in which an object side surface is convex in the optical axis. The object side surface or the image side surface of the first lens 100 may comprise at least one inflection point.

The radius of curvature of the object side surface of the first lens 100 may be a positive number. The radius of curvature of the object side surface of the first lens 100 in the optical axis may be a positive number. The radius of curvature of the image side surface of the first lens 100 may be a positive number. The radius of curvature of the image side surface of the first lens 100 in the optical axis may be a positive number. The radius of curvature of the object side surface of the first lens 100 may be smaller than the radius of curvature of the image side surface of the first lens 100. The first lens 100 may be a solid lens.

The imaging lens according to the third embedment uses the same reference numerals for the radius of curvature, the center thickness of each lens or the distance between the lens surfaces, the refractive index, Abbe's number, and the same parts in the imaging lens according to the first embodiment, and the description is omitted. For the omitted part of the description of the imaging lens according to the third embodiment, the description of the imaging lens according to the first embodiment may be applied by analogy.

TABLE 7

| Surface | Radius | Thickness | Index | Abbe # |
| --- | --- | --- | --- | --- |
| 1* | 1.4310 | 0.4754 | 1.5441 | 56.115 |
| 2* | 6.1181 | 0.0580 | | |
| 3* | 2.4864 | 0.2200 | 1.6714 | 19.238 |
| 4* (Stop) | 1.5520 | 0.2478 | | |
| 5* | 338.3630 | 0.2729 | 1.5441 | 56.115 |
| 6* | −8.4704 | 0.0200 | | |
| 7 | Infinity | | | |
| 8 | Infinity | | | |
| 9 | −56.5000 | | | |
| 10 | Infinity | | | |
| 11 | Infinity | 0.3198 | | |
| 12* | 12.6106 | 0.5300 | 1.5348 | 55.711 |
| 13* | −1.8836 | 0.3803 | | |
| 14* | −7.8409 | 0.3200 | 1.5348 | 55.711 |
| 15* | 1.3690 | 0.2159 | | |
| 16 | Infinity | 0.1100 | 1.523 | 54.5 |
| 17 | Infinity | 0.4547 | | |

Table 7 shows the surface number (Surface), the radius of curvature (Radius), the center thickness of each lens or the distance between the lens surfaces (Thickness), the refractive index (Index), Abbe's number (Abbe #) of the imaging lens according to the third embodiment of the present invention. At this time, the unit of the radius of curvature and the thickness or distance may be mm. ASP may mean an aspheric surface. SPH may mean a spherical surface. The imaging lens according to the third embodiment of the present invention may comprise an iris STOP. The iris STOP may be disposed between the second lens 200 and the third lens 300. The iris STOP may be disposed closer to the second lens 200 than the third lens 300. The iris STOP may be spaced apart from the object side surface of the third lens 300. The iris STOP can control the amount of light incident from the subject. The iris STOP can adjust the amount of light passing through the second lens 200. The iris STOP may adjust the amount of light incident to the third lens 300. The iris STOP may comprise a caliber iris.

TABLE 8

| | 1* | 2* | 3* | 4* | 5* |
|---|---|---|---|---|---|
| K | −0.04739414 | 7.289592018 | −0.3308487 | 0.102969977 | 204066.9042 |
| A | −0.00395435 | −0.17764959 | −0.34220584 | −0.15268775 | −0.20195763 |
| B | 0.168304177 | −0.12360903 | 1.077283088 | −0.3474795 | 0.247579698 |
| D | −1.19477291 | 8.240527086 | −0.35665921 | 10.09080021 | −1.36925455 |
| E | 4.992371782 | −50.9839484 | −9.56694438 | −66.0297659 | 5.240499652 |
| F | −11.9920247 | 163.0518884 | 42.68126514 | 238.9202965 | −9.92814636 |
| G | 16.88379528 | −292.946952 | −89.4576699 | −494.082646 | 11.97784887 |
| H | −12.7281531 | 279.0814606 | 93.41027889 | 543.865059 | −11.1352553 |
| I | 3.968129274 | −109.847901 | −39.4719519 | −245.754693 | 9.375364574 |
| J | 0 | 0 | 0 | 0 | 0 |

| | 6* | 12* | 13* | 14* | 15* |
|---|---|---|---|---|---|
| K | −46.8841197 | 65.48977024 | −0.63749671 | 8.038569146 | −0.92291864 |
| A | −0.13437982 | 0.047908122 | 0.241714687 | −0.09557731 | −0.3420439 |
| B | −0.34695529 | 0.065789077 | −0.12049909 | −0.08921558 | 0.236514601 |
| D | 2.944015654 | −0.42690609 | −0.08390316 | 0.179485283 | −0.13501376 |
| E | −14.0055045 | 0.84105464 | 0.226106066 | −0.16544262 | 0.055706842 |
| F | 38.83646939 | −0.94240414 | −0.19240934 | 0.09828123 | 0.01608004 |
| G | −61.0888564 | 0.645427077 | 0.083506099 | −0.03564143 | 0.003124037 |
| H | 50.3772491 | −0.27030815 | −0.01929568 | 0.007514507 | −0.00038293 |
| I | −16.4875885 | 0.063731056 | 0.002190335 | −0.00084675 | 2.64E-05 |
| J | 0 | −0.00645968 | −9.03E-05 | 3.95E-05 | 7.7983E-07 |

Table 8 shows the values of the aspheric coefficients and the conic constant k of each lens surface of the imaging lens according to a third embodiment of the present invention.

TABLE 9

| | Third embodiment |
|---|---|
| imgH | 5.8 |
| F_inf | 3.517 |
| F_macro | 3.311 |
| D_inf | 2 |
| D_macro | 22.6 |
| Fg1 | 4.19 |
| Fg2 | −19.16 |
| TTL | 4.32 |
| Fno | 2.2 |
| DFOV | 78.0 |
| G1 | 1.5441 |
| V1 | 56.1 |
| d1 | 1.039 |
| d2 | 0.734 |
| THIg1 | 1.274 |
| THIg2 | 1.23 |
| f1 | 3.3 |
| f2 | −6.717 |
| L1R1 | 1.431 |
| L2R2 | 1.552 |
| L1R2 | 6.118 |

Table 9 shows the characteristics of the imaging lens according to the third embodiment of the present invention.

TABLE 10

| | First embodiment | Second embodiment | Third embodiment |
|---|---|---|---|
| d1/d2 | 1.64 | 1.62 | 1.42 |
| Fg1/|Fg2| | 0.46 | 0.42 | 0.22 |
| d1/TTL | 0.25 | 0.28 | 0.24 |
| d1/imgH | 0.18 | 0.20 | 0.18 |
| d1 | 1.18 | 1.36 | 1.04 |
| THIg1/TTL | 0.26 | 0.25 | 0.29 |
| THIg2/TTL | 0.32 | 0.32 | 0.28 |

TABLE 10-continued

| | First embodiment | Second embodiment | Third embodiment |
|---|---|---|---|
| THIg1/imgH | 0.19 | 0.18 | 0.22 |
| THIg2/imgH | 0.23 | 0.23 | 0.21 |
| THIg1/d1 | 1.02 | 0.89 | 1.23 |
| THIg1/d2 | 1.67 | 1.44 | 1.74 |
| THIg2/d1 | 1.25 | 1.14 | 1.18 |
| THIg2/d2 | 2.05 | 1.85 | 1.68 |
| TTL/|D_inf| | 2.30 | 2.44 | 2.16 |
| TTL/|D_macro| | 0.24 | 0.24 | 0.19 |
| imgH/|D_inf| | 3.17 | 3.38 | 2.90 |
| imgH/|D_macro| | 0.33 | 0.33 | 0.26 |
| F_macro/F_inf | 0.94 | 0.93 | 0.94 |
| Fno/|D_inf| | 1.21 | 1.14 | 1.10 |
| Fno/|D_macro| | 0.13 | 0.11 | 0.10 |
| Fno/d1 | 2.07 | 1.67 | 2.12 |
| Fg1/TTL | 0.92 | 0.93 | 0.97 |
| |Fg2|/TTL | 1.99 | 2.20 | 4.44 |
| Fg1/imgH | 0.67 | 0.67 | 0.72 |
| |Fg2|/imgH | 1.44 | 1.58 | 3.30 |
| f1/L1R1 | 1.71 | 1.88 | 2.31 |
| L2R2/|f2| | 0.24 | 0.20 | 0.23 |
| Fg1/f1 | 1.27 | 1.26 | 1.27 |
| Fg1/|f2| | 0.76 | 0.69 | 0.62 |
| Fg1/L1R1 | 2.17 | 2.38 | 2.93 |
| Fg1/L2R2 | 3.21 | 3.54 | 2.70 |
| |Fg2|/f1 | 2.74 | 2.99 | 5.81 |
| |Fg2|/|f2| | 1.64 | 1.64 | 2.85 |
| |Fg2|/L1R1 | 4.70 | 5.63 | 13.39 |
| |Fg2|/L2R2 | 6.94 | 8.37 | 12.35 |
| tan(DFOV/2)/|D_inf| | 0.40 | 0.40 | 0.40 |
| tan(DFOV/2)/|D_macro| | 0.04 | 0.04 | 0.04 |
| G1 | 1.5441 | 1.5441 | 1.5441 |
| V1 | 56.1 | 56.1 | 56.1 |

TABLE 10-continued

|  | First embodiment | Second embodiment | Third embodiment |
|---|---|---|---|
| \|L1R2\|/L1R1 | 13.27 | 33.22 | 4.28 |
| TTL/imgH | 0.73 | 0.72 | 0.74 |
| F_inf/TTL | 0.83 | 0.83 | 0.81 |
| F_macro/TTL | 0.78 | 0.77 | 0.77 |
| F_inf/f1 | 1.14 | 1.13 | 1.07 |
| F_macro/f1 | 1.07 | 1.05 | 1.00 |
| F_inf/\|f2\| | 0.69 | 0.62 | 0.52 |
| F_macro/\|f2\| | 0.64 | 0.58 | 0.49 |

Referring to Table 10, it can be seen that the first to third embodiments of the present invention satisfy all of the Conditional Expressions. The first to third embodiments of the present invention may satisfy the range of $1.2<d1/d2<1.8$, $0<Fg1/|Fg2|<0.5$, $0.1<d1/TTL<0.4$, and $0.1<d1/imgH<0.4$, $0.8<d1<1.7$. In addition, in the first to third embodiments of the present invention may satisfy the range of $0.1<THIg1/TTL<0.4$, $0.1<THIg2/TTL<0.5$, $0.1<THIg1/imgH<0.4$, and $0.1<THIg2/imgH<0.4$. In addition, the first to third embodiments of the present invention may satisfy the range of $0.5<THIg1/d1<1.5$, $1<THIg1/d2<2$, $0.5<THIg2/d1<1.5$, and $1<THIg2/d2<2.3$. In addition, the first to third embodiments of the present invention may satisfy the range of $0.5<TTL/|D\_inf|<5$, $0.1<TTL/|D\_macro|<0.4$, $0.5<imgH/|D\_inf|<5$, and $0.1<imgH/|D\_macro|<0.4$. In addition, the first to third embodiments of the present invention may satisfy the range of $0.6<F\_macro/F\_inf<1$, $0.5<Fno/|D\_inf|<2$, $0<Fno/|D\_macro|<0.4$, and $1<Fno/d1<3$.

In addition, the first to third embodiments of the present invention may satisfy the range of $0.5<Fg1/TTL<2$, $|Fg2|/TTL>1$, $0.5<Fg1/imgH<1.2$, $|Fg2|/imgH>1.0$, and $0<f1/L1R1<5$. In addition, the first to third embodiment of the present invention may satisfy the range of $0<L2R2/|f2|<1$, $1.0<Fg1/f1<2.0$, $0<Fg1/|f2|<2$, $0<Fg1/L1R1<5$, and $1<Fg1/L2R2<10$. In addition, the first to third embodiments of the present invention may satisfy the range of $|Fg2|/f1>1$, $|Fg2|/|f2|>0.5$, $|Fg2|/L1R1>2$, and $|Fg2|/L2R2>3$.

In addition, the first to third embodiments of the present invention may satisfy the range of $0<\tan(DFOV/2)/|D\_inf|<0.8$, $0<\tan(DFOV/2)/|D\_macro|<0.5$, $1.5<G1<1.6$, $30<V1<60$, and $|L1R2|/L1R1>2$. In addition, the first to third embodiments of the present invention may satisfy the range of $0.7<TTL/imgH<1$, $0.5<F\_inf/TTL<1.5$, $0.5<F\_macro/TTL<1$, $0.5<F\_inf/f1<2$, and $0.5<F\_macro/f1<2$. In addition, the first to third embodiments of the present invention may satisfy the range of $0.2<F\_inf/|f2|<1.5$, and $0.2<F\_macro/|f2|<1.0$. At this time, the unit of imgH, F_inf, F_macro, Fg1, Fg2, TTL, Fno, d1, d2, THIg1, THIg2, f1, f2, L1R1, L2R1, and L1R2 may be mm.

Hereinafter, a camera module according to the present embodiment will be described with reference to the drawings.

Figure 5:
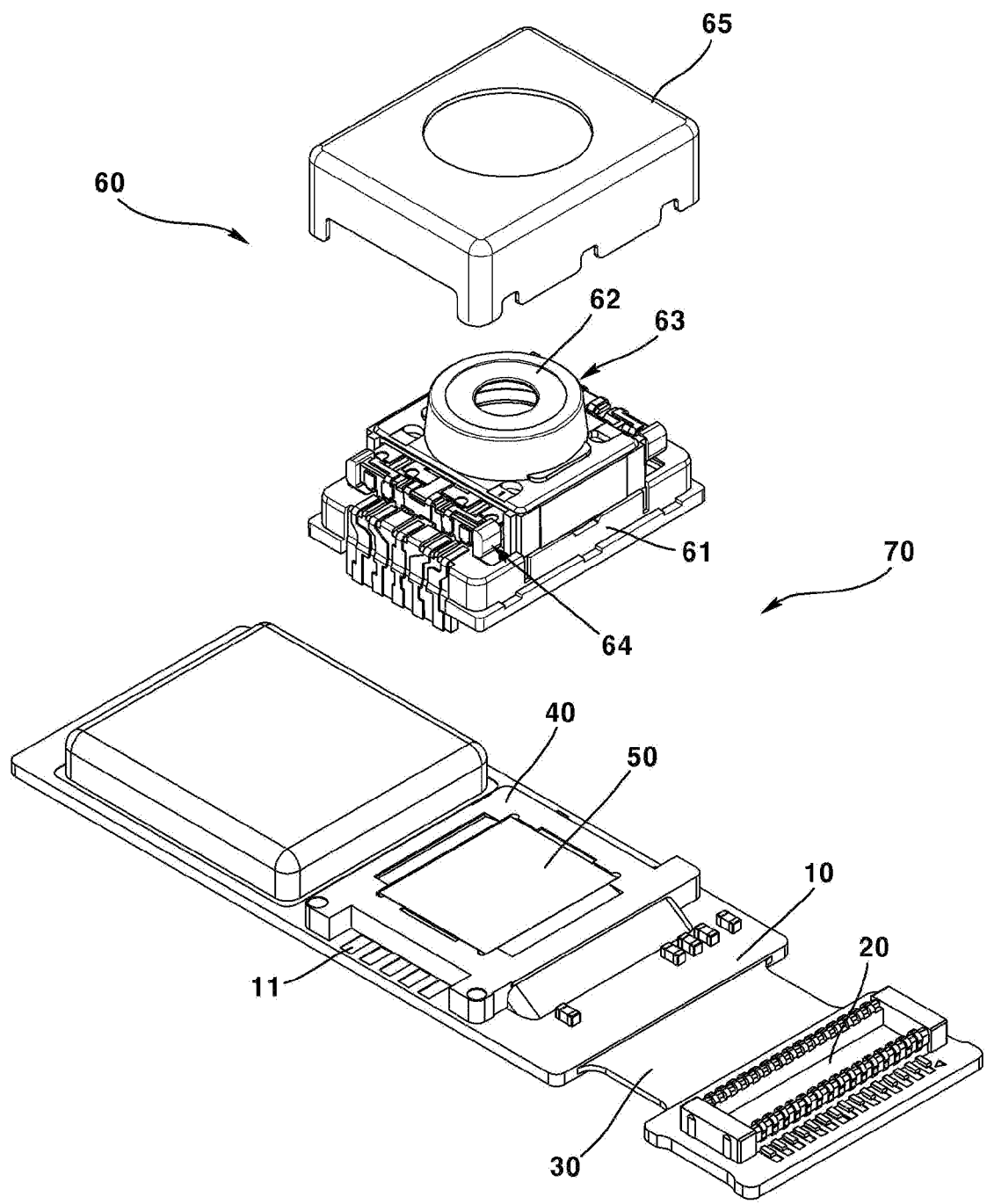
FIG. 5 is an exploded perspective view of a camera module according to the present embodiment.

FIG. 5 is an exploded perspective view of a camera module according to the present embodiment.

The camera device may comprise a camera module 70. The camera module 70 may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module.

The camera module 70 may comprise a substrate 10. The substrate 10 may be a printed circuit board (PCB). The substrate 10 may comprise an upper surface. An image sensor and a sensor base 40 may be disposed on the upper surface of the substrate 10. The substrate 10 may comprise a terminal 11. The terminal 11 of the substrate 10 may be electrically connected to the terminal of the holder 61 through an electrical conductive member.

The camera module 70 may comprise an image sensor (not shown). The image sensor may be disposed in the substrate 10. The image sensor may be disposed on the substrate 10. The image sensor may be disposed on an upper surface of the substrate 10. The image sensor may be electrically connected to the substrate 10. For example, the image sensor may be coupled to the substrate 10 by a surface mounting technology (SMT). As another example, the image sensor may be coupled to the substrate 10 by a flip chip technology. The image sensor may be disposed to coincide with an optical axis of the imaging lens. That is, the optical axis of the image sensor and the optical axis of the imaging lens may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The camera module 70 may comprise a connector 20. The connector 20 may be connected to the board 10 through the connection substrate 30. The connector 20 may comprise a port for electrically connecting to an external device.

The camera module 70 may comprise a sensor base 40. The sensor base 40 may be disposed between the holder 61 and the substrate 10. A filter 50 may be disposed on the sensor base 40. An opening may be formed in a portion of the sensor base 40 in which the filter 50 is disposed so that light passing through the filter 50 may be incident on the image sensor.

The camera module 70 may comprise a filter 50. The filter 50 may comprise an infrared filter. The infrared filter may block light in the infrared region from being incident on the image sensor. An infrared filter may reflect infrared radiation. Or, the infrared filter may absorb infrared radiation. The infrared filter may be disposed between the lens module 63 and the image sensor. The infrared filter may be disposed on the sensor base 40.

The camera module 70 may comprise a lens driving device 60. The lens driving device 60 may comprise a holder 61, a lens holder 62, a cover 65, and an imaging lens. The lens driving device 60 may perform an AF function and/or an OIS function using a liquid lens. The lens driving device 60 may be disposed on the sensor base 40. As a modified embodiment, the lens driving device 60 may be disposed directly on the substrate 10 without the sensor base 40.

The camera module 70 may comprise a holder 61. The holder 61 may be disposed on the substrate 10. The holder 61 may be disposed on the sensor base 40. The holder 61 may be disposed on an upper surface of the sensor base 40. The holder 61 may be coupled to the sensor base 40. The holder 61 may be coupled to the lens module 63. The holder 61 may be disposed within the cover 65. The holder 61 may be formed of an insulation material.

The lens module 63 may comprise a lens holder 62. The lens holder 62 may be a lens barrel. The lens holder 62 may be coupled to the holder 61. The lens holder 62 may be disposed on the holder 61. The lens holder 62 may accommodate an imaging lens therein. The inner circumferential surface of the lens holder 62 may be formed in a shape corresponding to the outer circumferential surface of the lens. The lens holder 62 may be formed of an insulation material.

The lens module 63 may comprise an imaging lens. An imaging lens may be disposed inside the lens holder 62. The imaging lens may comprise a plurality of lenses. The imaging lens may comprise a variable focus lens. The imaging lens may be an imaging lens according to the present embodiment described previously.

The lens driving device 60 may comprise a variable focus lens unit 64. The variable focus lens unit 64 may be disposed on the lens holder 62. The variable focus lens unit 64 may be coupled with the lens module 63. The variable focus lens unit 64 may be coupled with the lens holder 62. The variable focus lens unit 64 may be disposed on the lens holder 62. The variable focus lens unit 64 may be spaced apart from the holder 61. The variable focus lens portion 64 may be aligned with an imaging lens and an image sensor. The variable focus lens unit 64 may be fixedly inserted into the lens module 63 in a horizontal direction. The variable focus lens unit 64 may be disposed between a plurality of imaging lenses.

The camera module 70 may comprise a cover 65. The cover 65 may cover the holder 61. The cover 65 may be coupled to the holder 61. The cover 65 may accommodate a part of the lens module 63 therein. The cover 65 may form an outer appearance of the camera module 70. The cover 65 may have a hexahedral shape with an open lower surface. The cover 65 may be a non-magnetic material. The cover 65 may be formed of a metal material. The cover 65 may be formed of a metal plate. The cover 65 may be connected to the ground portion of the substrate 10. Through this, the cover 65 may be grounded. The cover 65 may block electromagnetic interference (EMI). At this time, the cover 65 may be referred to as an 'EMI shield can'.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:

1. An imaging lens comprising:
a first lens having positive (+) refractive power;
a second lens having negative (−) refractive power;
a third lens;
a fourth lens;
a fifth lens having positive (+) refractive power; and
a sixth lens having negative (−) refractive power,
wherein the first to sixth lenses are sequentially disposed from an object side to an image side,
wherein the first to third lenses and the fifth and sixth lenses are solid lenses,
wherein the fourth lens comprises a variable focus lens, and
wherein Conditional Expression 1 below is satisfied:

$|Fg2/L1R1|<2$  [Conditional Expression 1]

(where Fg2 means a composite focal length from the fifth lens to the sixth lens disposed at an image side of the variable focus lens, and L1R1 means a radius of curvature of an object side surface of the first lens).

2. The imaging lens of claim 1, wherein the third lens has a positive (+) refractive power.

3. The imaging lens of claim 1, wherein the object side surface of the first lens is convex, and an image side surface of the first lens is convex.

4. The imaging lens of claim 1, wherein an object side surface of the second lens is convex, and an image side surface of the second lens is concave.

5. The imaging lens of claim 1, wherein an object side surface of the third lens is convex, and an image side surface of the third lens is convex at an optical axis.

6. The imaging lens of claim 1, wherein an object side surface of the fifth lens is convex at an optical axis, and an image side surface of the fifth lens is convex at an optical axis.

7. The imaging lens of claim 1, wherein an object side surface of the sixth lens is concave at an optical axis, and the image side surface of the sixth lens is convex at an optical axis.

8. The imaging lens of claim 1, wherein Conditional Expression 2 below is satisfied:

$0<Fg1/L1R1<5$  [Conditional Expression 2]

(where Fg1 is a composite focal length from the first lens to the third lens disposed at an object side of the variable focus lens, and L1R1 is the radius of curvature of the object side surface of the first lens).

9. The imaging lens of claim 1, wherein Conditional Expression 3 below is satisfied:

$1.5<G1<1.6$  [Conditional Expression 3]

(where G1 is an refractive index of a material of the first lens).

10. An imaging lens comprising:
a first lens having positive (+) refractive power;
a second lens having negative (−) refractive power;
a third lens;
a fourth lens;
a fifth lens having positive (+) refractive power; and
a sixth lens having negative (−) refractive power,
wherein the first to sixth lenses are sequentially disposed from an object side to an image side,
wherein the first to third lenses and the fifth and sixth lenses are solid lenses,
wherein the fourth lens comprises a variable focus lens, and
wherein Conditional Expression 1 below is satisfied:

$0<Fg1/L1R1<5$  [Conditional Expression 1]

(where Fg1 is a composite focal length from the first lens to the third lens disposed at an object side of the variable focus lens, and L1R1 is the radius of curvature of the object side surface of the first lens).

11. The imaging lens of claim 1, wherein Conditional Expression 4 below is satisfied:

$0.7<TTL/imgH<1$  [Conditional Expression 4]

(where TTL is a length from the object side surface of the first lens to an imaging plane at an optical axis, and imgH is a diagonal length of the imaging plane of an image sensor).

12. The imaging lens of claim 1, wherein Conditional Expression 5 below is satisfied:

$30<V1<60$  [Conditional Expression 5]

(where V1 means an Abbe's number of the first lens).

13. The imaging lens of claim 1, wherein Conditional Expression 6 below is satisfied:

$0.1<THlg1/TTL<0.4$  [Conditional Expression 6]

(where THlg1 means a distance from the object side surface of the first lens to an image side surface of the third lens at an optical axis, and TTL means a distance from the object side surface of the first lens to an imaging plane at the optical axis).

14. The imaging lens of claim 1, wherein Conditional Expression 7 below is satisfied:

$$0.1 < THlg2/TTL < 0.5 \qquad \text{[Conditional Expression 7]}$$

(where THlg2 means a distance from an object side surface of the fifth lens to an image side surface of the sixth lens at an optical axis, and TTL means a distance from the object side surface of the first lens to an imaging plane at the optical axis).

15. The imaging lens of claim 1, wherein Conditional Expression 8 below is satisfied:

$$0.5 < THlg1/d1 < 1.5 \qquad \text{[Conditional Expression 8]}$$

(where THlg1 means a distance from the object side surface of the first lens to an image side surface of the third lens at an optical axis, and d1 is an optical axis distance from an imaginary tangent line at an apex of the image side surface of the third lens to an imaginary tangent line at an apex of an object side surface of the fifth lens).

16. The imaging lens of claim 1, wherein Conditional Expression 9 below is satisfied:

$$1 < THlg1/d2 < 2 \qquad \text{[Conditional Expression 9]}$$

(where THlg1 means a distance from the object side surface of the first lens to an image side surface of the third lens at an optical axis, and d2 means a thickness of the fourth lens at the optical axis).

17. The imaging lens of claim 1, wherein Conditional Expression 10 below is satisfied:

$$0.5 < THlg2/d1 < 1.5 \qquad \text{[Conditional Expression 10]}$$

(where THlg2 means a distance from an object side surface of the fifth lens to an image side surface of the sixth lens at an optical axis, and d1 is an optical axis distance from an imaginary tangent line at an apex of an image side surface of the third lens to an imaginary tangent line at an apex of an object side surface of the fifth lens).

18. The imaging lens of claim 1, wherein Conditional Expression 11 below is satisfied:

$$1 < THlg2/d2 < 2.3 \qquad \text{[Conditional Expression 11]}$$

(where THlg2 means a distance from an object side surface of the fifth lens to an image side surface of the sixth lens at an optical axis, and d2 means a thickness of the fourth lens at the optical axis).

19. A camera device comprising:
an image sensor;
the imaging lens of claim 1; and
a filter disposed between the image sensor and the imaging lens.

20. An imaging lens comprising:
a first lens having positive (+) refractive power;
a second lens having negative (−) refractive power;
a third lens having positive (+) refractive power;
a fourth lens;
a fifth lens having positive (+) refractive power; and
a sixth lens having negative (−) refractive power,
wherein the first to sixth lenses are sequentially disposed from an object side to an image side,
wherein the first to third lenses and the fifth and sixth lenses are solid lenses,
wherein the fourth lens comprises a variable focus lens,
wherein an object side surface of the first lens is convex, and an image side surface of the first lens is convex,
wherein an object side surface of the second lens is convex, and an image side surface of the second lens is concave,
wherein an object side surface of the third lens is convex, and an image side surface of the third lens is convex at an optical axis,
wherein an object side surface of the fifth lens is convex at the optical axis, and an image side surface of the fifth lens is convex at the optical axis,
wherein an object side surface of the sixth lens is concave at the optical axis, and the image side surface of the sixth lens is convex at the optical axis, and
wherein Conditional Expression 1 below is satisfied:

$$|Fg2/L1R1| < 2 \qquad \text{[Conditional Expression 1]}$$

(where Fg2 means a composite focal length from the fifth lens to the sixth lens disposed at an image side of the variable focus lens, and L1R1 means a radius of curvature of the object side surface of the first lens).

* * * * *